United States Patent [19]
Ohnuma

[11] Patent Number: 5,472,265
[45] Date of Patent: Dec. 5, 1995

[54] ANTILOCK BRAKING CONTROL APPARATUS FOR ELECTRIC VEHICLE

[75] Inventor: Yutaka Ohnuma, Numazu, Japan

[73] Assignee: Toyota Jidosha Kabushiki Kaisha, Toyota, Japan

[21] Appl. No.: 164,814

[22] Filed: Dec. 10, 1993

[30]     Foreign Application Priority Data

Dec. 10, 1992 [JP] Japan ................................... 4-330614
Dec. 10, 1992 [JP] Japan ................................... 4-330615
Jan. 21, 1993 [JP] Japan ................................... 5-008501

[51] Int. Cl.$^6$ .................................................. B60T 13/74
[52] U.S. Cl. ........................... 303/3; 188/156; 180/65.1
[58] Field of Search ............................. 303/3, 20, 113.1, 303/15; 188/156, 158; 180/65.1, 165; 318/364, 371

[56]               References Cited

U.S. PATENT DOCUMENTS

| | | | |
|---|---|---|---|
| 4,962,969 | 10/1990 | Davis ............................................ | 303/3 |
| 5,287,772 | 2/1994 | Aoki et al. ................................ | 303/3 X |
| 5,318,355 | 6/1994 | Asanuma et al. ............................ | 303/3 |

FOREIGN PATENT DOCUMENTS 2-141354  5/1990  Japan.
2-120165  5/1990  Japan.

Primary Examiner—Robert J. Oberleitner
Assistant Examiner—Peter M. Poon
Attorney, Agent, or Firm—Cushman Darby & Cushman

[57]                ABSTRACT

An antilock braking control apparatus includes a regenerative braking part operatively connected with one or more traction motors of an electric vehicle for braking a plurality of wheels of the vehicle by using regenerative braking torque, a second braking part operatively connected with the wheels of the vehicle for braking the wheels by using brake fluid pressure, an antilock brake system part for performing an antilock brake system control process to control a braking force produced by either the regenerative braking part or the second braking part on the wheels to avoid slipping of the braked wheels, and a braking control part for changing a braking force produced by the other braking part on the wheels to equal zero after the antilock brake system part has started performing an antilock brake system control process relating to the former braking part.

18 Claims, 25 Drawing Sheets

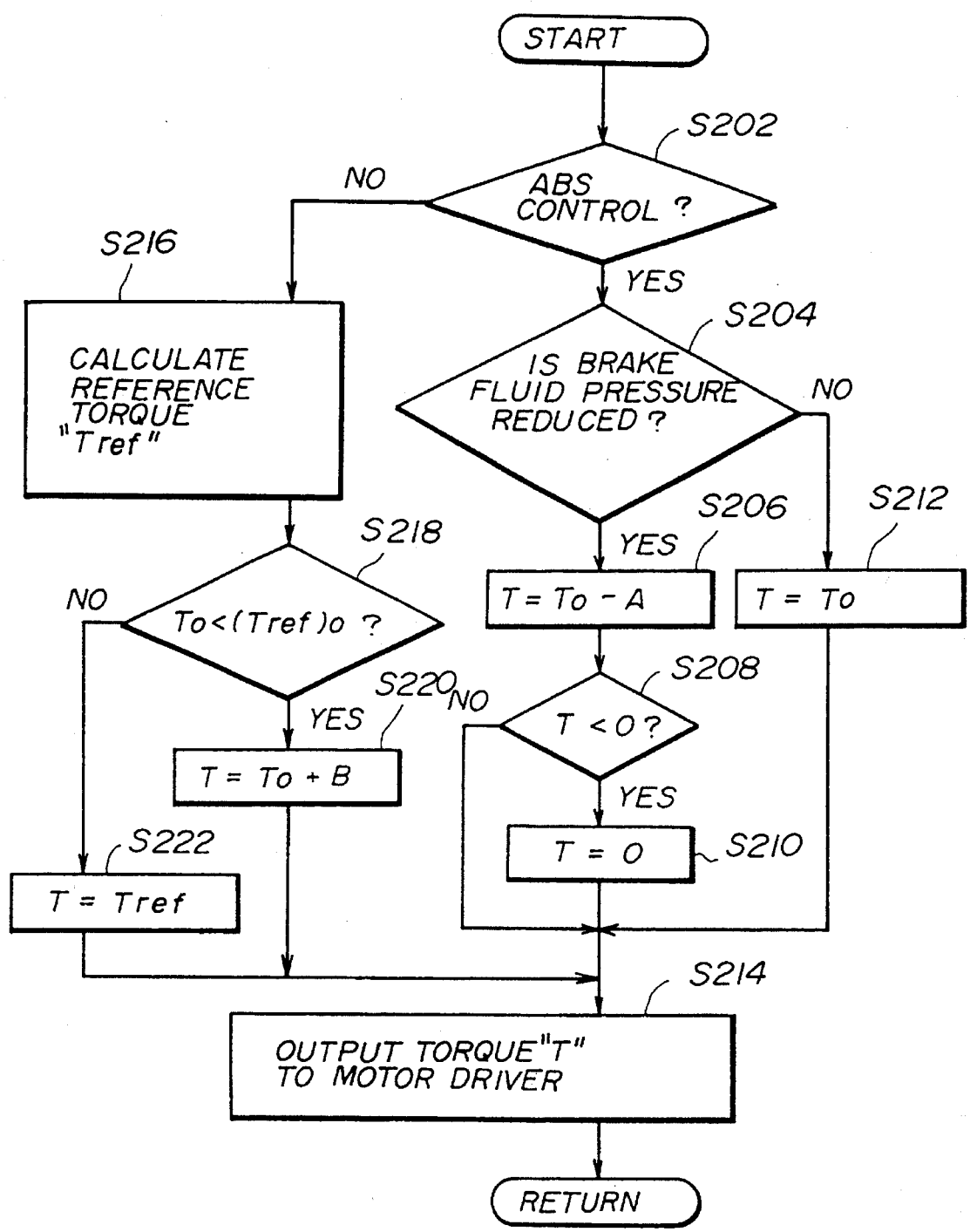

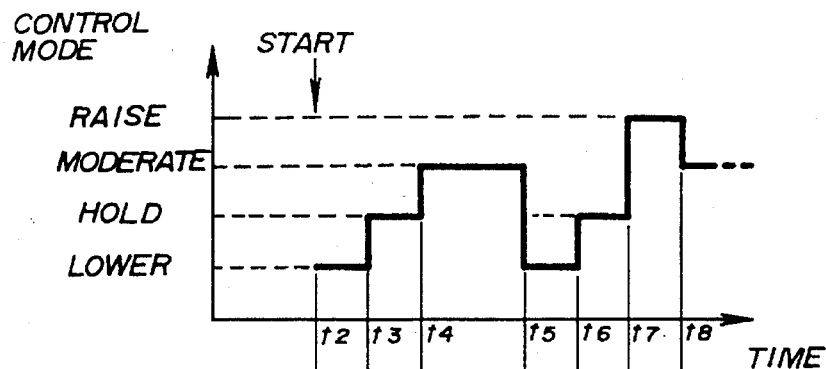
FIG.11A
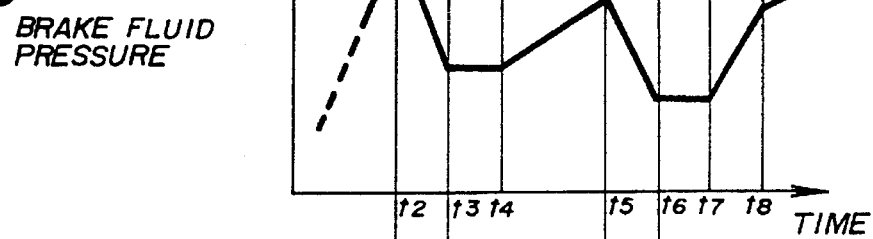
FIG.11B BRAKE FLUID PRESSURE
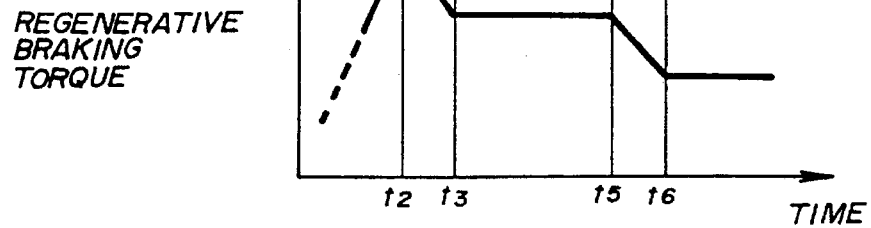
FIG.11C REGENERATIVE BRAKING TORQUE

BRAKE FLUID PRESSURE

REGENERATIVE BRAKING TORQUE

ANTILOCK BRAKING CONTROL APPARATUS FOR ELECTRIC VEHICLE

BACKGROUND OF THE INVENTION (1) Field of the Invention

The present invention generally relates to an antilock braking control apparatus, and more particularly to an antilock braking control apparatus for an electric vehicle in which both a regenerative braking system and a friction braking system are used.

(2) Description of the Related Art

An electric vehicle is propelled by a traction motor using electric power supplied from a storage battery, and wheels of the electric vehicle are rotated by the traction motor. It is expected that the use of electric vehicles will become increasingly common in the future since they will not cause the environmental pollution which is the dominant problem of gasoline-fuel vehicles.

Generally, the wheels of the electric vehicle are braked by using a combination of an electrical braking system and a mechanical braking system. It is difficult to reliably brake the wheels of the electric vehicle by using the electrical braking system only.

Hereinafter, the electrical braking refers to a regenerative braking method or system by which the kinetic energy of the vehicle derived from the traction motor is transformed into electric energy, and the electric energy is re-stored in the storage battery. The braking of the traction motor is achieved by the regenerative braking system, and the wheels of the vehicle are thus braked.

Hereinafter, the mechanical braking refers to a known friction braking method or system which is commonly used in gasoline-fuel automotive vehicles. For example, a hydraulic brake is used as one of the mechanical braking systems. Generally, the gasoline-fuel vehicle has a plurality of hydraulic brakes operatively connected with the wheels of the vehicle, and the wheels are braked by the wheel-to-road friction produced by the hydraulic brakes by using the brake fluid pressure actuated to the hydraulic brakes.

An antilock brake system (ABS) is known as a braking system of an automotive vehicle. The ABS is designed for preventing braked wheels from slipping or skidding if the brake torque exceeds the available wheel torque capacity, and the braking force acting on the wheels is effectively reduced by the ABS especially when the vehicle is running on a snowy or iced road and the wheels are suddenly braked.

Japanese Laid-Open Patent Publication No. 2-141354 discloses an antilock brake control device for an electric vehicle. The electric vehicle uses an electric brake and a pneumatic brake for the braking of the wheels, and the antilock brake control device performs an ABS control process when the slippage of the braked wheels is detected. During the execution of the ABS control process, the regenerative braking force of the electrical brake is reduced, and at the same time the braking force by the pneumatic brake is held at a given level for a given time period.

Therefore, in the conventional device disclosed in the above mentioned publication, the braking force by the pneumatic brake is acting on the related wheel when the regenerative braking force by the electric brake is reduced during the execution of the ABS control process. The effect of the ABS control process to prevent the braked wheels from slipping on the road is influenced by the pneumatic braking force held at the given level. For this reason, the running stability and controllability of the vehicle is likely to be worse when the ABS control process is performed.

SUMMARY OF THE INVENTION

Accordingly, the present invention provides an improved antilock braking control apparatus in which the above described problem is eliminated.

The present invention also provides an antilock braking control apparatus which ensures increased running stability and controllability of the electric vehicle when the ABS control process is performed to avoid slipping of the braked wheels.

The above mentioned advantages of the present invention are achieved by an antilock braking control apparatus which includes a regenerative braking part operatively connected with one or more traction motors of an electric vehicle for braking a plurality of wheels of the vehicle by using regenerative braking torque, a second braking part operatively connected with the wheels of the vehicle for braking the wheels of the vehicle by using brake fluid pressure, an antilock brake system part for performing an antilock brake system control process to control a braking force produced by either the regenerative braking part or the second braking part on the wheels to avoid slipping of the braked wheels on a road, and a braking control part for changing a braking force produced by the other one of the two braking parts on the wheels to equal zero after the antilock brake system part has started performing an antilock brake system control process relating to the above one of the two braking parts.

According to the present invention, the effect of the ABS control process to reduce a braking force produced by one of the two braking parts on the wheels is not influenced by the braking force produced by the other braking part on the wheels during the execution of the ABS control process. When the ABS control process is performed with the second braking part, the braking force produced by the second braking part on the wheels is reduced to avoid the slipping of the braked wheels. At the same time, the braking force by the regenerative braking part is changed to zero so that the effect of the ABS control process on the wheels is not influenced by the braking force by the regenerative braking part. Thus, it is possible to ensure increased running stability and controllability of the vehicle when the ABS control process is performed.

BRIEF DESCRIPTION OF THE DRAWINGS

The above and other objects, features and advantages of the present invention will be more apparent from the following detailed description when read in conjunction with the accompanying drawings in which:

FIG. 10 is a flow diagram for explaining an antilock braking control process of the second embodiment performed by the system shown in FIG. 3;

FIGS. 11A through 11C are timing charts for explaining the relationship between the control mode, the brake fluid pressure and the regenerative braking torque when the ABS control process is started;

DESCRIPTION OF THE PREFERRED EMBODIMENTS

First embodiment of the antilock braking control apparatus according to the present invention will be described with reference to FIG. 1.

Figure 1:
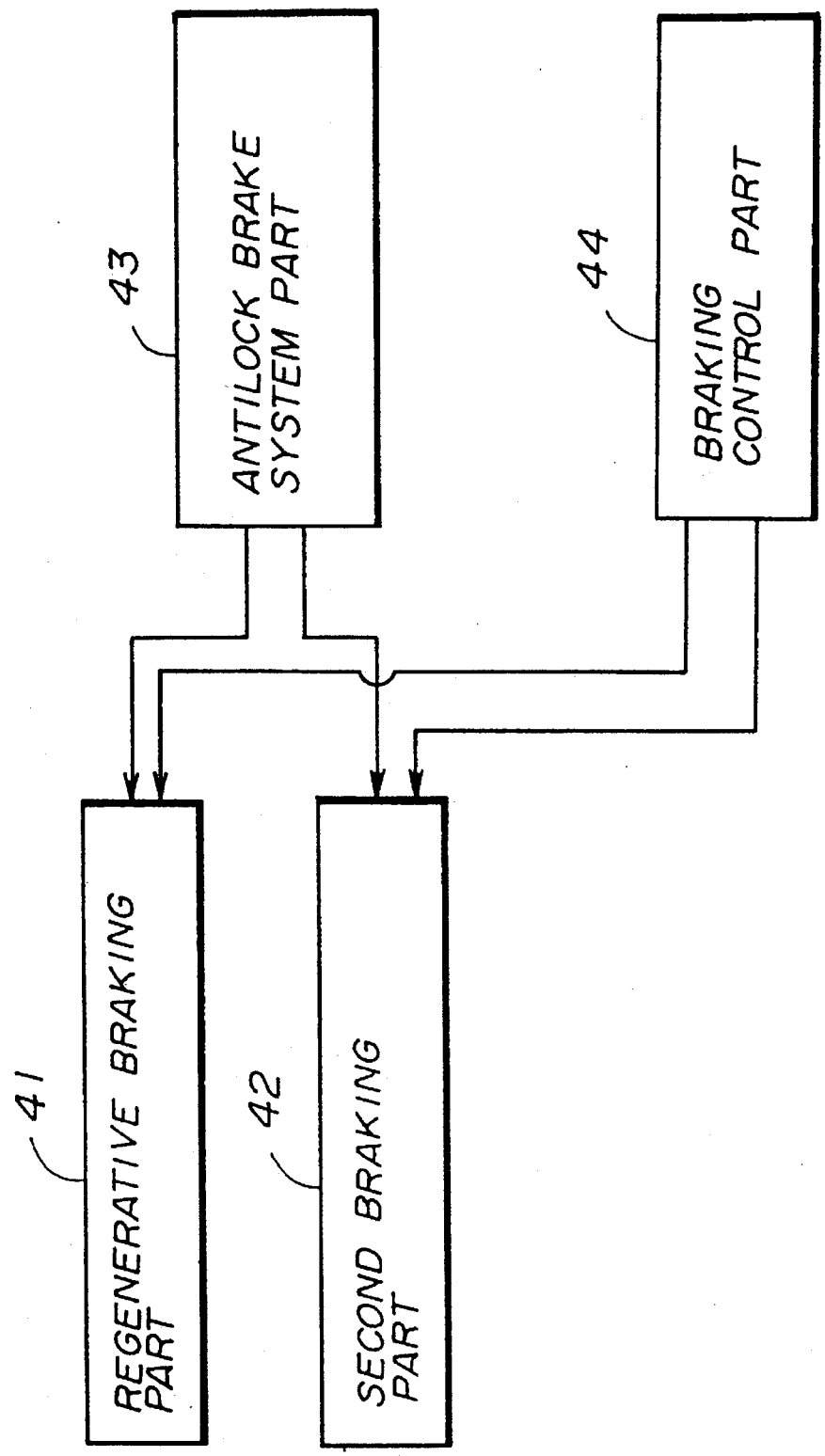
FIG. 1 is a block diagram showing a first embodiment of the antilock braking control apparatus according to the present invention.

FIG. 1 shows an antilock braking control apparatus according to the first embodiment. This apparatus includes a regenerative braking part 41, a second braking part 42, an antilock brake system part 43, and a braking control part 44. In FIG. 1, the regenerative braking part 41 is operatively connected with one or more traction motors of an electric vehicle for braking a plurality of wheels of the vehicle by using regenerative braking torque. The second braking part 42 is operatively connected with the wheels of the vehicle for braking the wheels of the vehicle by using brake fluid pressure. The antilock brake system part 43 performs an antilock brake system (ABS) control process to control a braking force produced by either the regenerative braking part 41 or the second braking part 42 on the wheels to avoid slipping of the braked wheels on a road. The braking control part 44 changes the braking force produced by the other braking part 41 or 42 on the wheels to equal zero when the antilock brake system part 43 has started performing an antilock brake system (ABS) control process relating to the first braking part 41 and 42.

In the first embodiment mentioned above, the effect of the ABS control process to reduce a braking force produced by one of the two braking parts on the wheels is not influenced by the braking force produced by the other braking part on the wheels during execution of the ABS control process. Therefore, it is possible to ensure increased running stability and controllability of the vehicle when the ABS control process is performed.

Next, a description will be given with reference to FIGS. 2 and 3 of an electric vehicle to which the present invention is applied.

Figure 2:
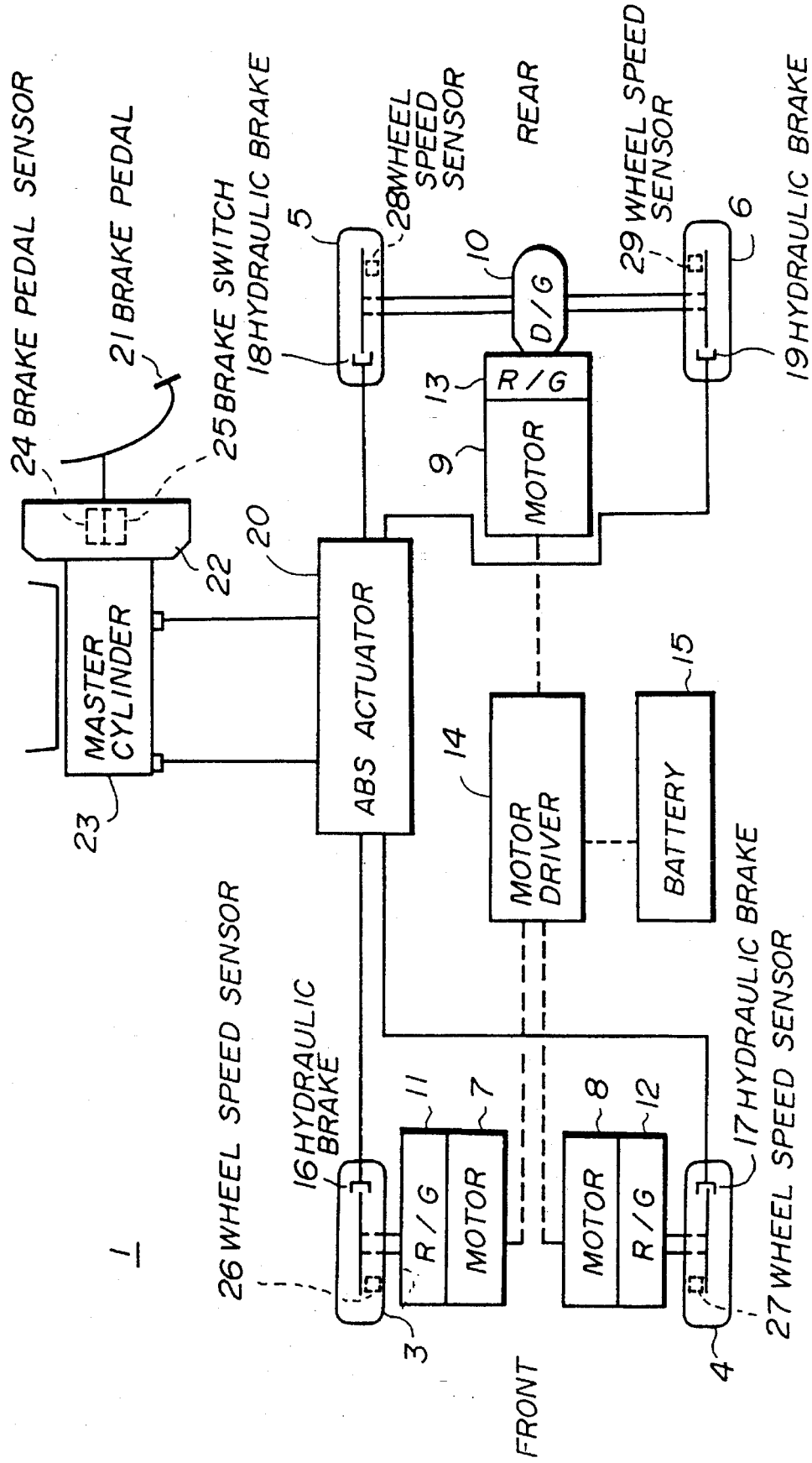
FIG. 2 is a diagram showing an electric vehicle to which the present invention is applicable.

FIG. 2 shows the electric vehicle to which the antilock braking control apparatus of the present invention is applied. In FIG. 2, the electric vehicle 1 has four wheels 3 through 6: a front right wheel 3, a front left wheel 4, a rear right wheel 5 and a rear left wheel 6. A traction motor 7 is connected to the front right wheel 3 via a reduction gear (R/G) 11, and a traction motor 8 is connected to the front left wheel 4 via a reduction gear (R/G) 12. The front wheels 3 and 4 are independently rotated by the traction motors 7 and 8.

The rear wheels 5 and 6 are coupled to each other by a rear axle. A differential gear (D/G) 10 is connected to an intermediate portion of the rear axle. A traction motor 9 is connected to the differential gear 10 via a reduction gear (R/G) 13. Thus, the rear wheels 5 and 6 are rotated by the traction motor 9.

Like a known transmission coupled to a gasoline-fuel engine, the reduction gears 11–13 reduce the rotation speed of each traction motor. Generally, the output power of the traction motors 7–9 is lower than the output power of the gasoline-fuel engine. However, because of the reduction gears 11–13, the traction motors 7–9 can produce an output torque adequate to run the vehicle.

The traction motors 7–9 serve as the regenerative braking system of the electric vehicle 1. When the regenerative braking acts while the vehicle is running, the kinetic energy of the vehicle via the rotating force of the wheels 3–6 is transformed into electric energy, and the electric energy is re-stored in a storage battery 15. That is, the storage battery 15 is charged with the electric energy from regenerative braking. The rotating speed of the traction motors 7–9 are reduced due to the energy transformation and storage, and the wheels 3–6 are braked.

In the electric vehicle in FIG. 2, a motor driver 14 is connected to the traction motors 7 through 9, and a motor control unit 30 (not shown in FIG. 2) is connected to the motor driver 14. The operation of each traction motor is controlled by the motor driver 14 in accordance with instructions supplied from the motor control unit 30. The motor control unit 30 is chiefly made up of a known electronic control unit (ECU). FIG. 3 shows the antilock braking control system of the electric vehicle 1 shown in FIG. 2. The motor control unit 30 is shown in FIG. 3 and will be described in detail below.

In FIG. 2, the battery 15 is connected to the traction motors 7–9 via the motor driver 14, and electric power is supplied from the battery 15 to each traction motor via the motor driver 14. The traction motors 7–9 are rotated when electric power is supplied to the traction motors 7–9 under control of the motor driver 14 so that the electric vehicle 1 is propelled. On the other hand, the traction motors 7–9 are subject to the regenerative braking when the storage battery 15 is charged with electric power generated from the rotating force of the wheels 3–6.

In the electric vehicle in FIG. 2, hydraulic brakes 16 through 19 are arranged in the wheels 3 through 6, respectively. Each of the hydraulic brakes 16 through 19 is provided with a brake cylinder, and the braking force of each hydraulic brake acting on the corresponding wheel is adjusted according to the brake fluid pressure applied to the brake cylinder of the hydraulic brake.

An ABS actuator 20 is connected to the four hydraulic brakes 16 through 19, and a brake control unit 31 (not shown in FIG. 2) is connected to the ABS actuator 20. The brake fluid pressure applied to each hydraulic brake is controlled by the ABS actuator 20 according to instructions supplied from the brake control unit 31 to control the braking force of each hydraulic brake acting on the corresponding wheel. The brake control unit 31 is chiefly made up of the known electronic control unit (ECU). The brake control unit 31 is shown in FIG. 3, and it will be described in detail below.

A brake pedal 21 is depressed by a vehicle operator when the vehicle operator feels that braking is necessary while during vehicle. The brake pedal 21 is connected with a master cylinder 23 via a brake booster 22. A brake pedal pressure produced according to the force by which the brake pedal 21 is depressed by the vehicle operator is supplied from the master cylinder 23 to the ABS actuator 20. The brake fluid pressure to be applied to each hydraulic brake is adjusted by the ABS actuator 20 based on the brake pedal pressure supplied from the master cylinder 23 to the ABS actuator 20.

In addition, a brake pedal sensor 24 and a brake switch 25 are arranged in the brake booster 22 such that the brake pedal sensor 24 and the brake switch 25 are operatively connected with the brake pedal 21. The brake pedal sensor 24 senses the force by which the brake pedal 21 is depressed by the vehicle operator, and the sensor 24 outputs a brake pedal signal indicating the depression force to the motor control unit 30 as indicated in FIG. 3. The brake switch 25 detects whether the brake pedal 21 is depressed, and the brake switch 25 outputs a brake switch signal indicating the brake pedal depression or the non-depression to the brake control unit 31 as indicated in FIG. 3.

In addition, wheel speed sensors 26 through 29 are arranged in the wheels 3 through 6, and sense the wheel speeds. These wheel speed sensors 26–29 are connected to the brake control unit 31, and each wheel speed signal is supplied to the brake control unit 31 as indicated in FIG. 3.

Next, a description will be given with reference to FIG. 3 of the antilock braking control system of the electric vehicle 1. As shown in FIG. 3, the antilock braking control system 2 is comprised of the motor driver 14, the motor control unit 30, the ABS actuator 20, and the brake control unit 31.

Each of the electronic control units (ECU) of the motor control unit 30 and the brake control unit 31 comprises a micro processing unit (MPU), a read only memory (ROM), a random access memory (RAM), and an input/output (I/O) interface circuit. The component parts mentioned above which are not shown in FIG. 3 are interconnected by a system bus within the ECU. The motor driver 14 and the brake pedal sensor 24 are connected to the ECU of the motor control unit 30 vie the I/O interface circuit of the unit 30. The ABS actuator 20, the brake switch 25 and the wheel speed sensors 26–29 are connected to the ECU of the brake control unit 31 via the I/O interface circuit of the unit 31.

In the first embodiment of the antilock braking control system according to the present invention, an antilock brake system (ABS) control process for the hydraulic brakes 16–19 is performed by the brake control unit 31. Generally, the ABS control process is performed by the antilock braking control system 2 shown in FIG. 3 in order to prevent the braked wheels from slipping if the brake torque exceeds the available wheel torque capacity. When the ABS control process is performed by the brake control unit 31, an ABS execution flag signal indicating the execution of the ABS control process is sent from the brake control unit 31 to the motor control unit 30, as indicated in FIG. 3.

Next, a description will be given, with reference to FIGS. 4 and FIGS. 6A, 6B, 6D and 6E, of the ABS control process performed by the antilock braking control system 2 shown in FIG. 3.

In the event that the vehicle is suddenly braked while the vehicle is traveling on a snowy or icy road with a very low road friction coefficient, it is very likely that the braked wheels will slip on the road, and the driver's control of the vehicle at this time becomes unstable and poor. In order to prevent the braked wheels from slipping on the road, the ABS control process is performed by the antilock braking control system 2. In the course of the ABS control process, the brake fluid pressure applied to the hydraulic brakes 16–19 is adjusted such that the braking force of each hydraulic brake on the corresponding wheel is quickly reduced to prevent the brake torque from exceeding the available wheel torque capacity.

Figure 4:
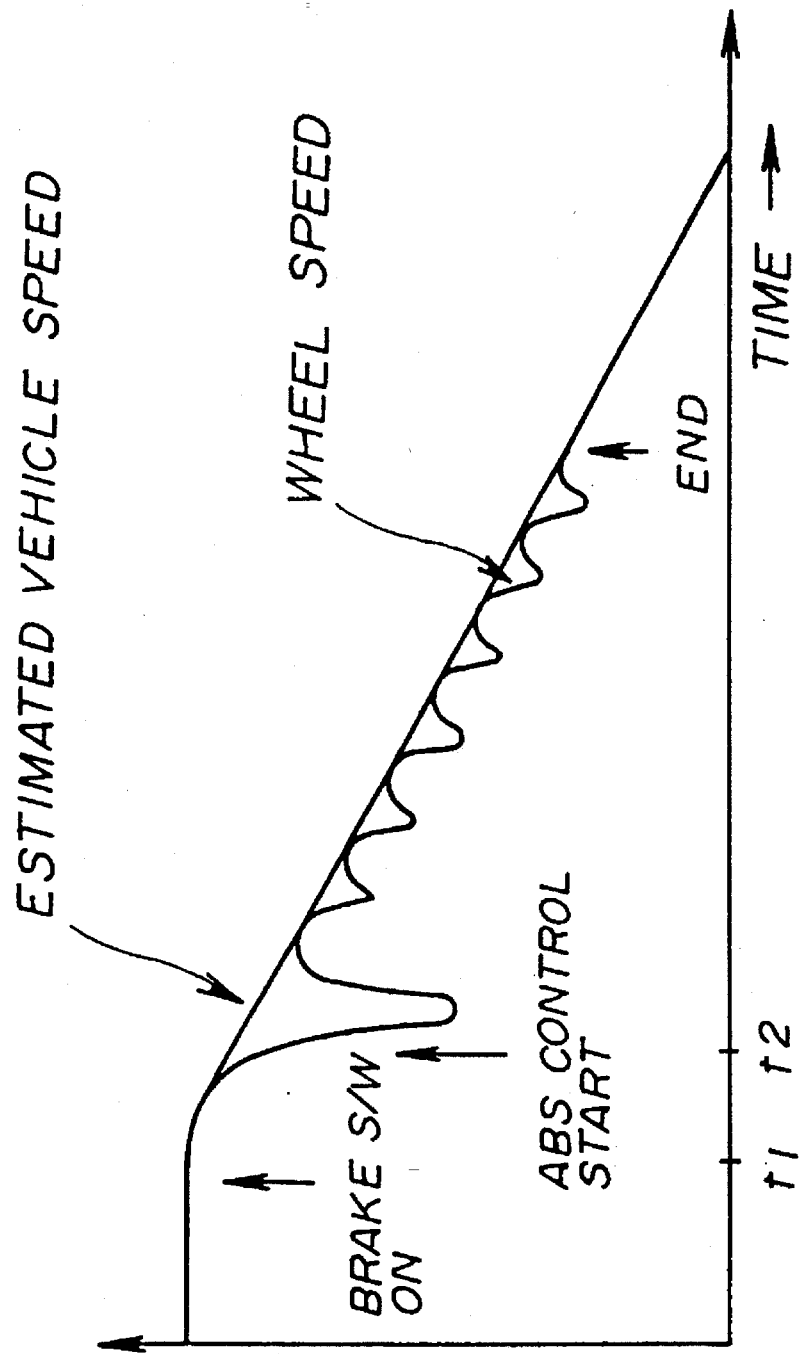
FIG. 4 is a timing chart for explaining an antilock brake system (ABS) control process.

FIG. 4 shows changes in the vehicle speed and the wheel speed during the ABS control process. The brake control unit 31 always monitors the rotating speed of the wheels 6–9 based on the wheel speed signals supplied from the wheel speed sensors 26–29 and calculates an estimated vehicle speed based on the wheel speeds sensed. The brake control unit 31 also detects whether the brake pedal 21 is depressed based on the brake switch signal supplied from the brake switch 25.

When the brake pedal 21 is depressed, the brake control unit 31 detects whether the wheel speed which is below the estimated vehicle speed has become lower than a given slippage limit speed. If the wheel speed is lower than the slippage limit speed, it is determined by the brake control unit 31 that the braked wheels are slipping. In FIG. 4, "t1" denotes the time at which the brake pedal is depressed, and "t2" denotes the time at which the ABS control process is started.

Figure 6A:
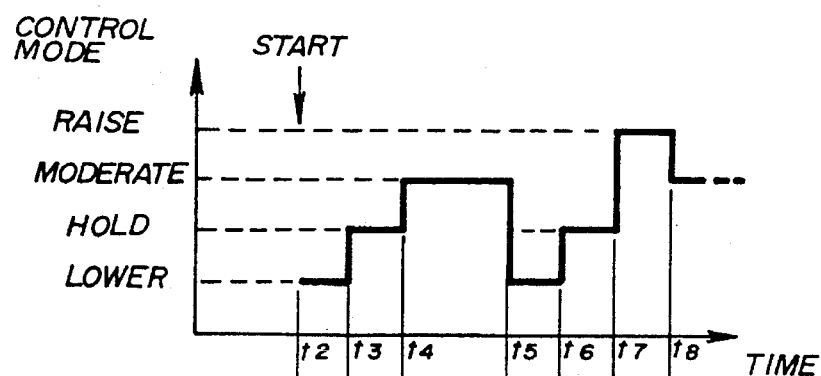
FIGS. 6A through 6F are timing charts for explaining the relationship between the control mode, the brake fluid pressure, and the regenerative braking torque from the start of the ABS control process to the end thereof.
Figure 6B:
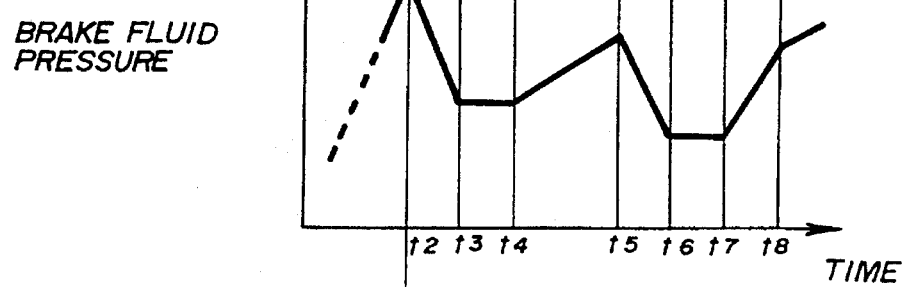

The brake control unit 31 starts performing the ABS control process at the time "t2". As indicated in FIG. 6A, the control mode of the brake control unit 31 changes to the LOWER mode at the start of the ABS control process.

In the LOWER mode, the brake control unit 31 instructs the ABS actuator 20 to reduce the brake fluid pressure applied to the hydraulic brakes 16–19. This control operation of the brake control unit 31 is indicated in the timing charts of FIGS. 6A and 6B in the time periods between "t2" and "t3" and between "t5" and "t6". The braking force by the hydraulic brakes 16–19 on the wheels 3–6 is reduced based on the brake fluid pressure supplied from the ABS actuator 20 to an appropriate level where it is possible to effectively prevent the braked wheels from slipping. Consequently, it is possible to prevent the running stability and controllability of the vehicle from being lowered.

As the braking force by the hydraulic brakes 16–19 on the wheels 3–6 is reduced by the LOWER mode control operation of the brake control unit 31, the rotating speed of the wheels 3–6 increases from the previous rotating speed during the LOWER mode. If the wheel speed has become higher than the slippage limit speed, the brake control unit 31 determines that the electric vehicle 1 has recovered from the slipping condition. The control mode of the brake control unit 31 at this time changes from the LOWER mode to the HOLD mode.

In the HOLD mode, the brake control unit 31 instructs the ABS actuator 20 to maintain the brake fluid pressure applied to the hydraulic brakes 16–19. The braking force by the ABS actuator 20 on the wheels 3–6 at this time is held constant. The HOLD mode control operation of the brake control unit 31 is indicated in the timing charts of FIGS. 6A and 6B in the time periods between "t3" and "t4" and between "t6" and "t7".

As the braking force by the hydraulic brakes 16–19 on the wheels 3–6 is maintained in the HOLD mode, the rotating speed of the wheels 3–6 increases. If the wheel speed becomes higher than the estimated vehicle speed, the brake control unit 31 determines that the wheels 3–6 are not slipping at all. The control mode of the brake control unit 31 at this time changes from the HOLD mode to either the MODERATE mode or the RAISE mode.

In the MODERATE mode the brake fluid pressure is increased by the ABS actuator 20 at a moderate rate of increase, and in the RAISE mode the brake fluid pressure is raised at a relatively high rate of increase. In order to prevent the braking force on the wheels from rapidly increasing, either the MODERATE mode or the RAISE mode, whichever is appropriate, is selected by the brake control unit 31 to suitably increase the brake fluid pressure.

In either the MODERATE mode or the RAISE mode, the braking force acting on the wheels 3–6 is raised by the hydraulic brakes 16–19 according to the brake fluid pressure supplied from the ABS actuator 20. This control operation is indicated in the timing charts of FIGS. 6A and 6B in the time periods between "t4" and "t5" and between "t7" and "t8".

As the ABS control process described above is repeatedly performed by the brake control unit 31, it is possible to effectively prevent the braked wheels from slipping. The running stability and controllability of the electric vehicle 1 can be increased.

Figure 6C:
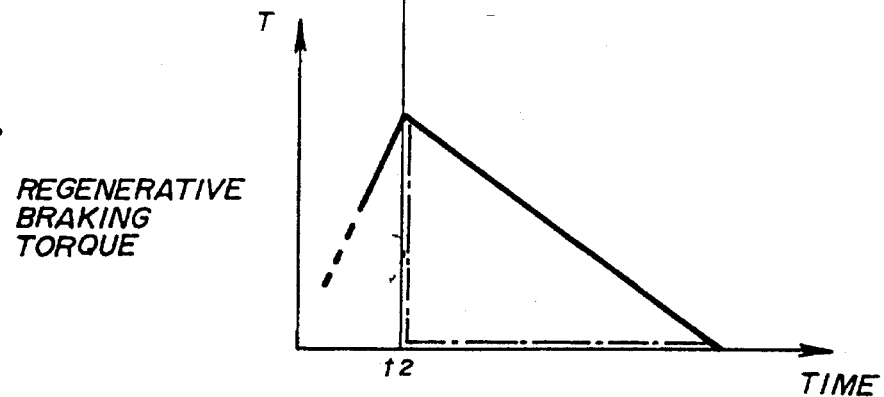
Figure 6D:
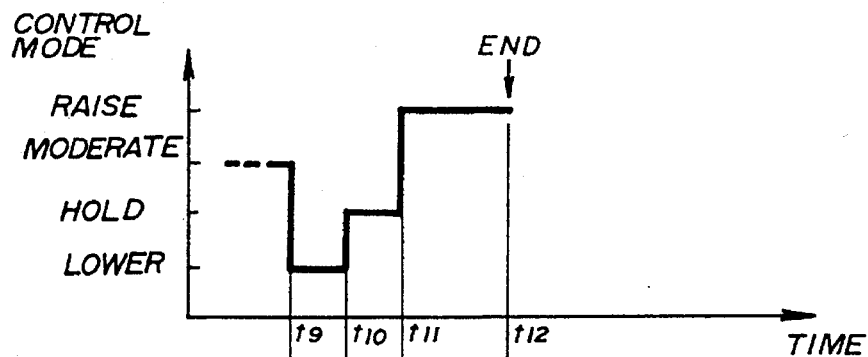
Figure 6E:
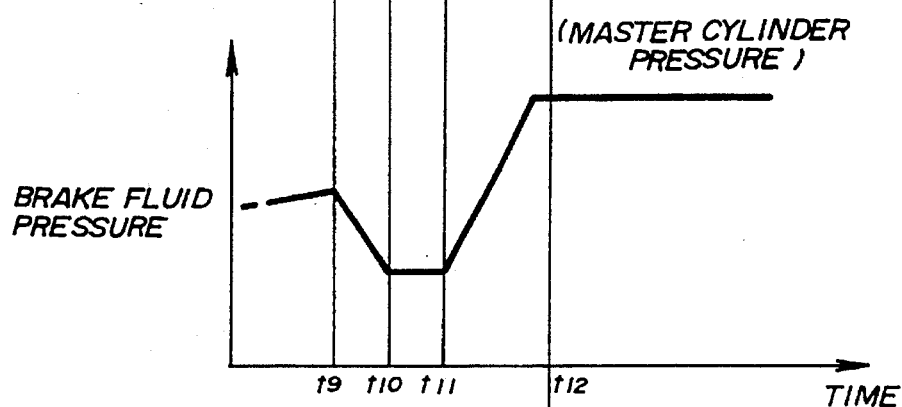

If the running time during which the brake control unit 31 is continuously in the RAISE mode exceeds a predetermined time period (which is equivalent to the time period between "t11" and "t12" in FIGS. 6D and 6E), the brake control unit 31 determines that execution of the ABS control process is not needed. As indicated in FIGS. 6D and 6E, the ABS control process is temporarily finished at the time "t12".

Next, a description will be given with reference to FIGS. 5, 6C and 6F of the antilock braking control process according to the present invention. This antilock braking control process is repeatedly performed by the motor control unit 30 of the system in FIG. 3 at given time intervals.

Figure 5:
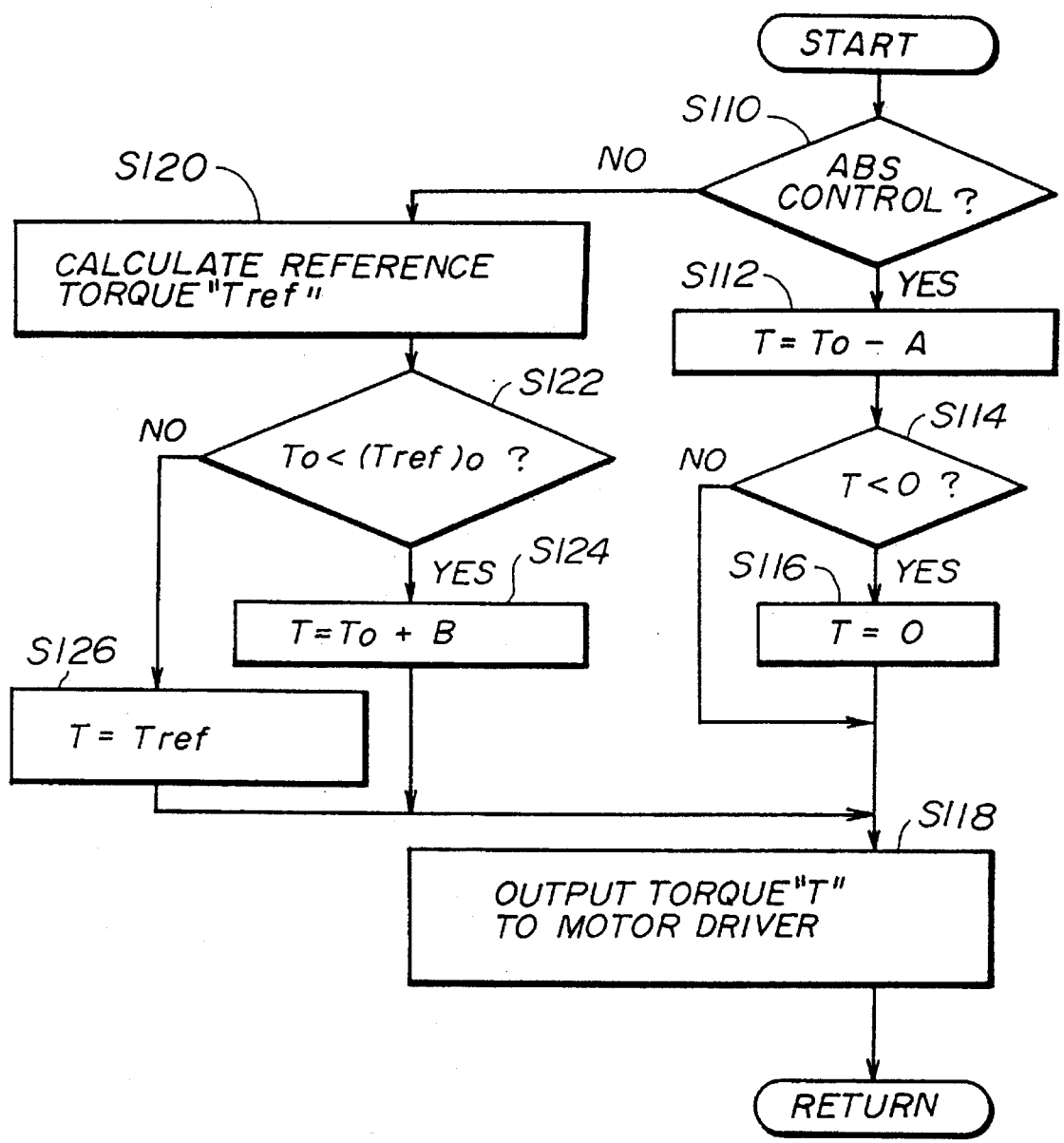
FIG. 5 is a flow diagram for explaining an antilock braking control process performed by the antilock braking control system shown in FIG. 3.
Figure 6F:
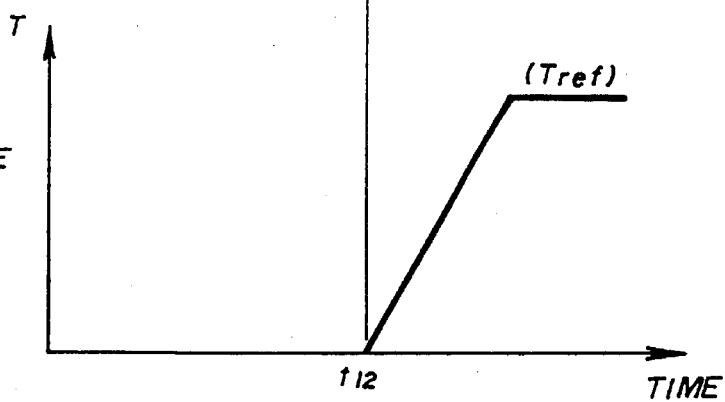

FIG. 5 shows the antilock braking control process for determining a regenerative braking torque T output to the motor driver 14 when the ABS control process is performed by the brake control unit 31. FIG. 6C shows changes of the regenerative braking torque T when the ABS control process is started, and FIG. 6F shows changes of the regenerative braking torque T when the ABS control process is finished.

When the antilock braking control process in FIG. 5 is started, step S110 detects whether or not the ABS control process is currently performed by the brake control unit 31. As described above, the ABS execution flag signal is sent from the brake control unit 31 to the motor control unit 30 if the ABS control process is started. The motor control unit 30 detects whether the ABS control process is currently performed based on the ABS execution flag signal supplied from the brake control unit 31.

If the result at step S110 is affirmative, step S112 is performed. In step S112, the motor control unit 30 calculates a regenerative braking torque T by subtracting a given torque value "A" from the previous regenerative braking torque To (T= To–A). The previous regenerative braking torque To was previously calculated when step S112 was performed at the previous execution cycle of the antilock braking control process.

After step S112 is performed, step S114 detects whether the value of the regenerative braking torque T calculated in step S112 is less 570 than zero (or negative). If the regenerative braking torque value is below zero in step S114, step S116 sets the regenerative braking torque T equal to zero (T=0). After step S116 is performed, step S118 outputs the regenerative braking torque value to the motor driver 14. The motor driver 14 changes the regenerative braking torque of the traction motors 7–9 to equal zero. The antilock braking control process in FIG. 5 is temporarily finished.

On the other hand, if the regenerative braking torque T is greater than or equal to zero in step S114, the process ships to step S118. In step S118, the regenerative braking torque value T calculated in step S112 is output to the motor driver 14. The motor driver 14 changes the regenerative braking torque of the traction motors 7–9 to equal the calculated torque value T. The antilock braking control process in FIG. 5 is temporarily finished.

The above described steps S110 through S118 are repeatedly performed after the start (the time "t2") of the ABS control process performed by the brake control unit 31. As indicated in FIG. 6C, the regenerative braking torque T determined by the motor control unit 30 is gradually reduced and soon reaches zero. The regenerative braking torque of the traction motors 7–9 is held at the zero level for a given time period.

In the antilock braking control process of FIG. 5, when the ABS control process is started by the brake control unit 31, the regenerative braking force of the traction motors 7–9 is changed by the motor driver 14 and the motor control unit 30 such that the regenerative braking force is gradually reduced until it equals zero. The effect of the ABS control process on the frictional braking force of the hydraulic brakes 16–19 on the wheels 3–6 is not influenced by the regenerative braking force. Thus, it is possible to ensure an increased running stability and controllability of the vehicle.

The regenerative braking torque T is gradually reduced and soon reaches zero due to repetition of the step S112. It is possible to prevent the running condition of the vehicle from being influenced by a sudden reduction of the regenerative braking force of the traction motors 7–9 while the frictional braking force of the hydraulic brakes 16–19 is reduced during execution of the ABS control process. The rate of change of the regenerative braking torque T can be preset to an appropriate rate of change by varying the torque value "A" in step S112 to a suitable value.

In the antilock braking control process of FIG. 5, if the result at step S110 is negative (the ABS control process is not currently performed), step S120 is performed. In step S120, the motor control unit 30 calculates a reference torque "Tref" based on the brake pedal signal supplied from the brake pedal sensor 24 to the motor control unit 30. This reference torque Tref is a target braking torque at which the regenerative braking torque T is aimed through the antilock braking control process. As described above, the brake pedal signal indicates the force by which the brake pedal 21 is depressed by the vehicle operator. The reference torque Tref calculated in step S120 varies depending on the depression force applied by the vehicle operator.

After the reference torque Tref is calculated in step S120, step S122 detects whether the previous regenerative braking torque To is smaller than the previous reference torque (Tref)o. The previous regenerative braking torque To is the torque value previously output to the motor driver 14 in step S118 at the previous execution cycle of the antilock braking control process. The previous reference torque (Tref)o is the torque value previously calculated in step S120 at the previous execution cycle of the process in FIG. 5. In step S122, the motor control unit 30 determines whether the regenerative braking torque T output to the motor driver 14 has reached the reference torque Tref.

If the result at step S122 is affirmative (To<(Tref)o), it is determined that the regenerative braking torque T has not reached the reference torque Tref. Step S124 calculates the regenerative braking torque T by adding a given torque value B to the previous regenerative braking torque To.

After the regenerative braking torque T is calculated in step S124, step S118 outputs the regenerative braking torque value T, calculated in step S124, to the motor driver 14. The motor driver 14 changes the regenerative braking torque of the traction motors 7–9 to equal the calculated torque value T. The antilock braking control process in FIG. 5 is temporarily finished.

On the other hand, if the result at step S122 is negative (To> (Tref)o), it is determined that the regenerative braking torque T has reached the reference torque Tref. Step S126 sets the regenerative braking torque T to be equal to the reference torque Tref. After step S126 is performed, step S118 outputs the regenerative braking torque value in step S126 to the motor driver 14. The antilock braking control process in FIG. 5 is temporarily finished.

The above described steps S120 through S126 are repeatedly performed after the end (the time "t12") of the ABS control process by the brake control unit 31. As indicated in FIG. 6F, the regenerative braking torque T determined by the motor control unit 30 is gradually raised to equal the reference torque Tref. The regenerative braking torque of the traction motors 7–9 is held at the torque value Tref. Thus, the antilock braking control process after the end of the ABS control process is performed by the motor control unit such that the regenerative braking torque T is raised toward the reference torque Tref, and the reference torque Tref is calculated based on the depression force applied to the brake pedal 21.

Figure 7:
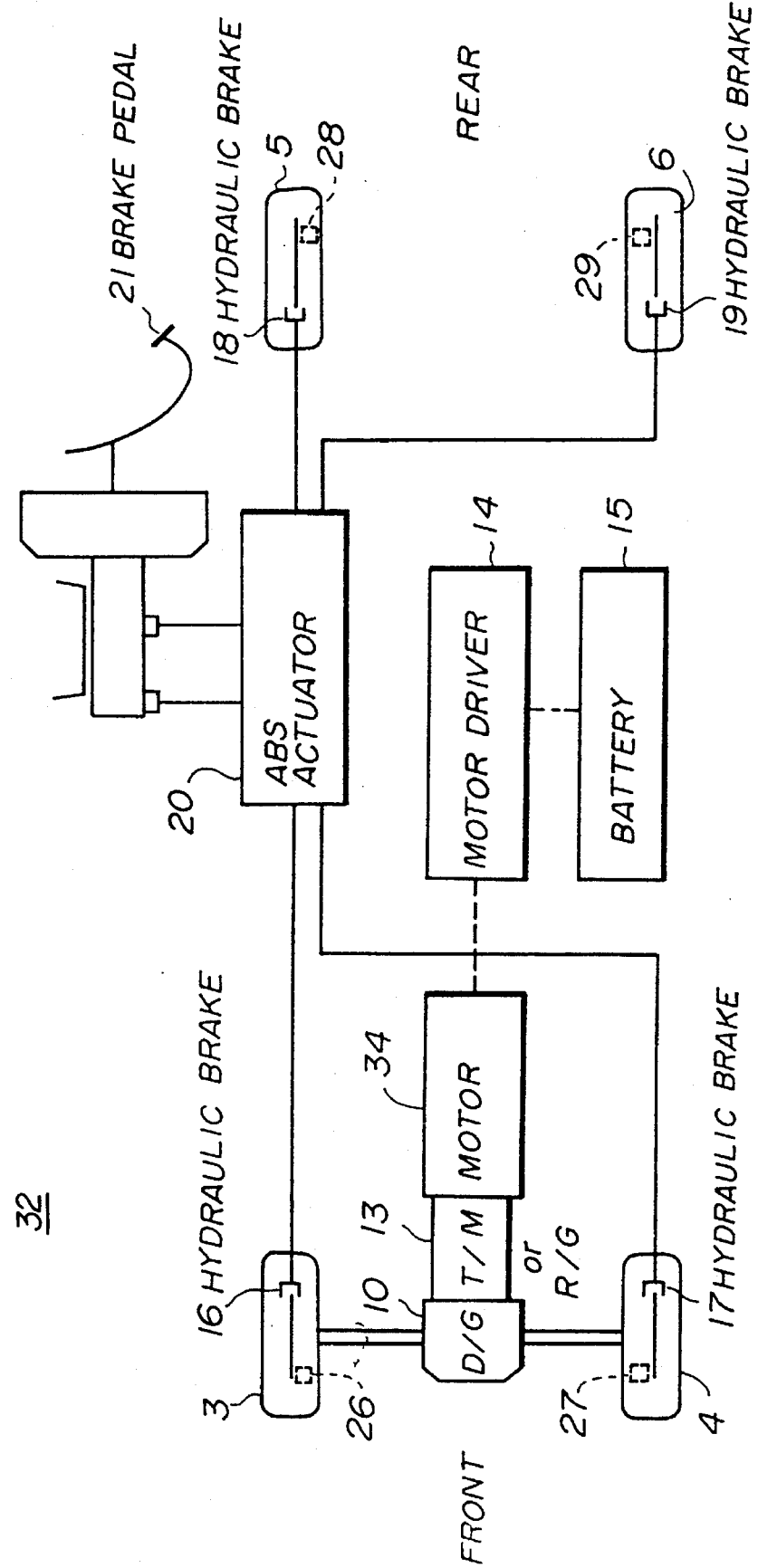
FIGS. 7 and 8 are diagrams showing other electric vehicles to which the present invention is applicable.
Figure 8:
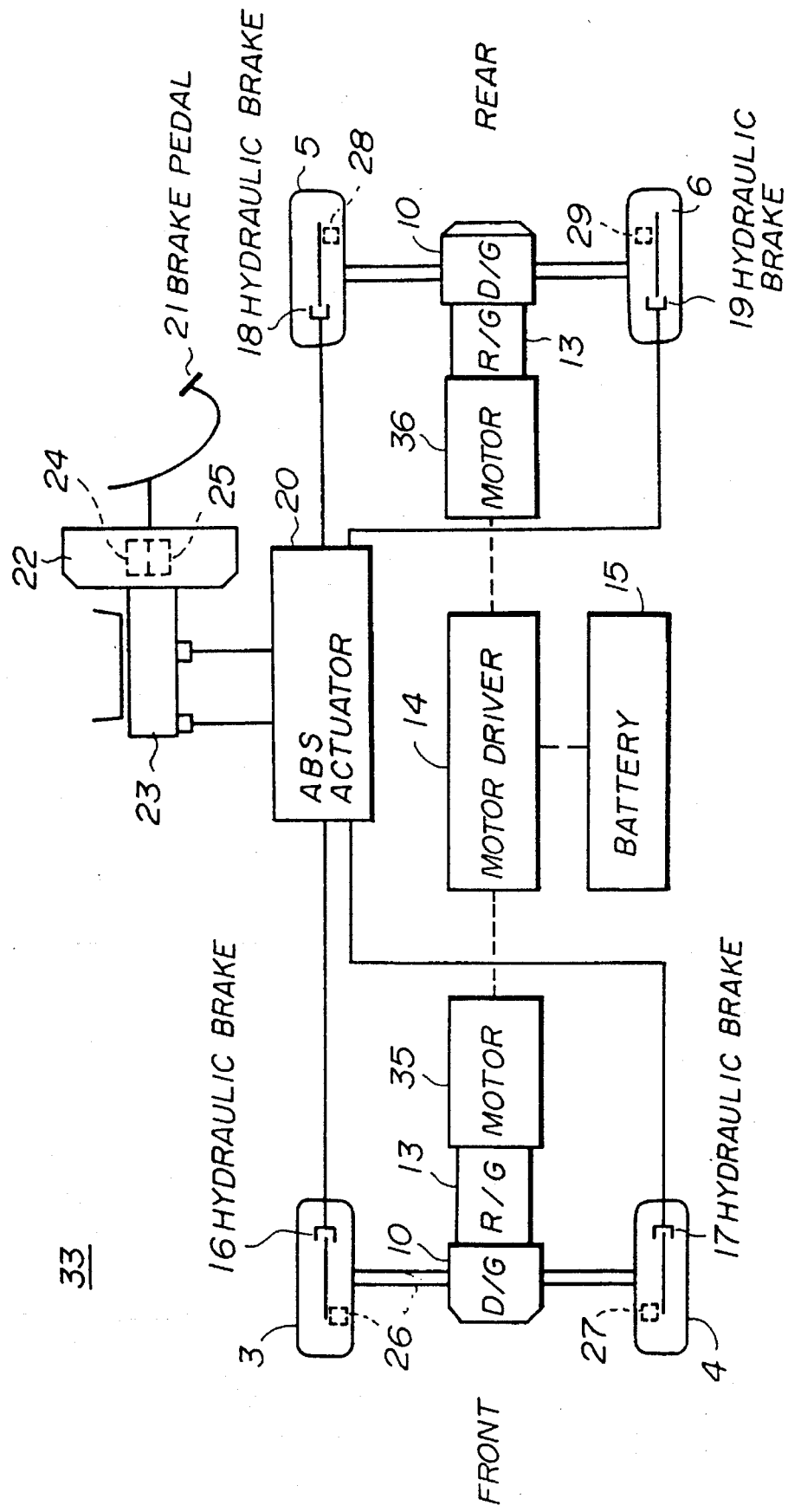

FIGS. 7 and 8 show other examples of electric vehicles to which the antilock braking control apparatus according to the present invention is applicable. In FIGS. 7 and 8, the parts which are the same as corresponding parts shown in FIG. 2 are designated by the same reference numerals, and a description thereof will be omitted.

In FIG. 7, an electric vehicle 32 is shown in which the two front wheels 3 and 4 are rotated by a traction motor 34. The front right and left wheels 3 and 4 are coupled to each other by a front axle, and the differential gear 10 is connected to an intermediate portion of the front axle. The traction motor 34 is connected to the differential gear 10 via the reduction gear (R/G) 13. The motor driver 14 is connected to the traction motor 34 only. In the electric vehicle 32 in FIG. 7, a transmission (T/M) may be used instead of the reduction gear 13.

In FIG. 8, an electric vehicle 33 is shown in which the two front wheels 3 and 4 are rotated by a traction motor 35 and the two rear wheels 5 and 6 are rotated by a traction motor 36. The traction motor 35, the differential gear 10 and the reduction gear (R/G) 13, connected to the front wheels 3 and 4, are constructed similar to FIG. 7. The traction motor 36, the differential gear 10 and the reduction gear (R/G) 13, connected to the rear wheels 5 and 6, are constructed similar to FIG. 2. The motor driver 14 is connected to both the traction motors 35 and 36.

It is readily understood that the antilock braking control apparatus of the present invention described above is applicable to the electric vehicles 32 and 33 in FIGS. 7 and 8 as well as the electric vehicle 1 in FIG. 2.

In the first embodiment described above, the regenerative braking torque value determined by the motor control unit 30 is gradually reduced to equal zero after the start of the ABS control process. However, the present invention is not limited to this embodiment. According to the present invention, it is possible to modify the first embodiment to change the regenerative braking torque T to zero torque simultaneously with the start of the ABS control process as indicated by a dotted line in FIG. 6C.

In the first embodiment described above, the ABS control process is performed by the brake control unit 31, and the motor control unit 30 reduces the regenerative braking torque T of the traction motors 7–9 to zero during execution of the ABS control process. According to the present invention, it is possible to modify the first embodiment such that the motor control unit 30 performs the ABS control process (for reducing the regenerative braking force of the traction motors 7–9) and the brake control unit 31 changes the braking force produced by the hydraulic brakes 16–19 on the wheels to zero during execution of the ABS control process.

Next, a description will be given with reference to FIGS. 9 through 12C of a second embodiment of the antilock braking control apparatus according to the present invention.

In the first embodiment described above, the reduction of the braking force produced by either of the two braking parts (the regenerative braking part 41 and the second braking part 42) on the wheels does not necessarily agree with the reduction of the braking force produced by the other braking part on the wheels. There is a possibility that the reduction of the braking force produced by one of the braking parts on the wheels substantially agrees with the increase of the braking force produced by the other braking part on the wheels. At such a time, the first embodiment has a problem in that the running stability and controllability of the vehicle may become poor when the ABS control process is performed. In order to eliminate this problem, the second embodiment of the present invention which will be described below is proposed.

Figure 9:
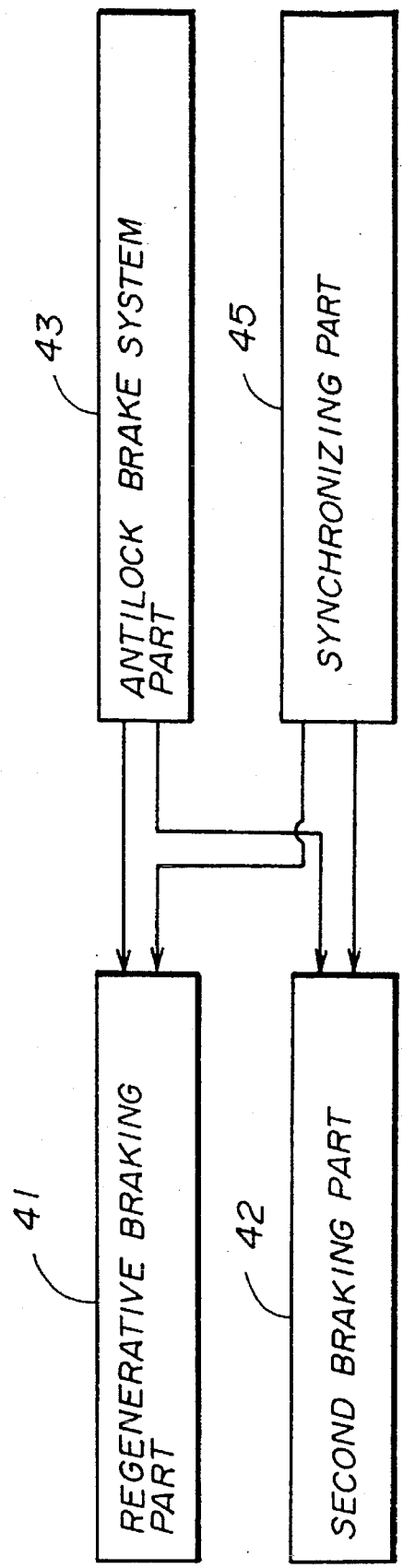
FIG. 9 is a block diagram showing a second embodiment of the antilock braking control apparatus according to the present invention.

FIG. 9 shows the second embodiment of the antilock braking control apparatus according to the present invention. In FIG. 9, the antilock braking control apparatus comprises the regenerative braking part 41, the second braking part 42, the antilock brake system part 43, and a synchronizing part 45.

In the antilock braking control apparatus in FIG. 9, the regenerative braking part 41 is operatively connected with one or more traction motors of an electric vehicle for braking a plurality of wheels of the vehicle by using regenerative braking torque. The second braking part 42 is operatively connected with the wheels of the vehicle for braking the wheels of the vehicle by using brake fluid pressure. The antilock brake system part 43 performs an antilock brake system control process to control a braking force produced by either the regenerative braking part 41 or the second braking part 42 on the wheels to avoid slipping of the braked wheels.

When an antilock brake system control process relating to one of the two braking parts 41 and 42 is performed by the antilock brake system part 43, the synchronizing part 45 reduces the braking force produced by the other braking part 41 or 42 on the wheels synchronized with the reduction in braking force produced by the first braking part during the antilock brake system control process.

In the second embodiment, the synchronizing part 45 allows the reduction in braking force produced by one of the braking parts to always be synchronized with the reduction in braking force produced by the other braking part. Thus, it is possible for the second embodiment to effectively reduce the braking force produced by one of the two braking parts on the wheels when the braking force produced by the other braking part during execution of the ABS control process is reduced in a synchronous manner.

Next, a description will be given of an antilock braking control process of the second embodiment performed by the antilock braking control system shown in FIG. 3. FIG. 10 shows this antilock braking control process. The antilock braking control process in FIG. 10 is performed by the motor control unit 30 of the system in FIG. 3 to determine a regenerative braking torque value to be output to the motor driver 14.

Figure 12A:
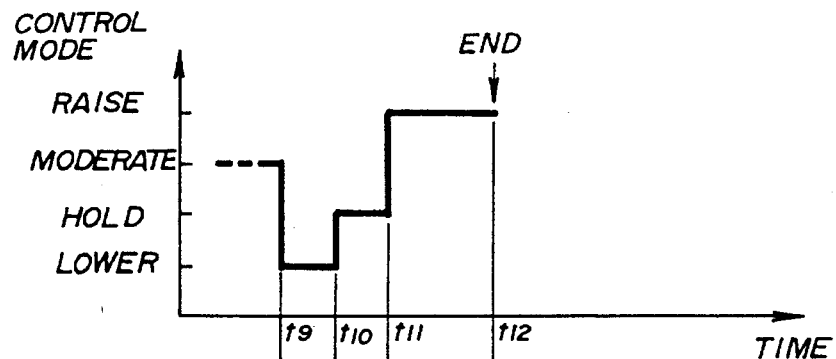
FIGS. 12A through 12C are timing charts explaining the relationship between the control mode, the brake fluid pressure and the regenerative braking torque when the ABS control process is finished.
Figure 12B:
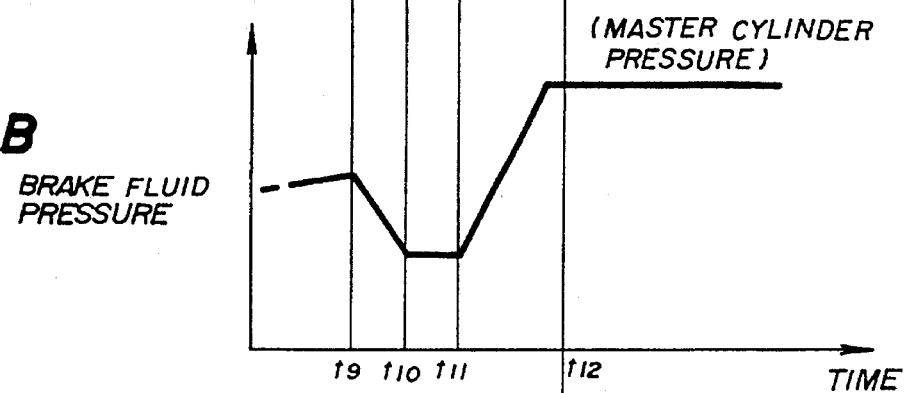
Figure 12C:
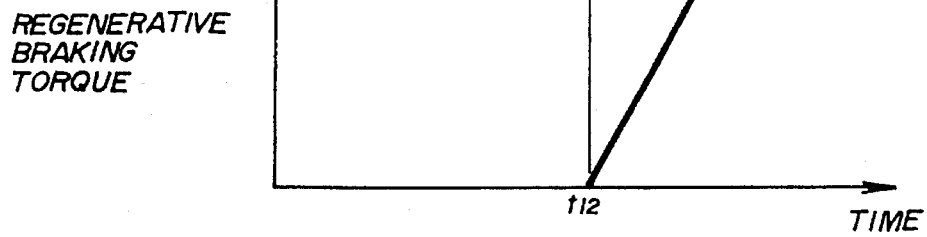

FIGS. 11A through 11C show the relationship between the control mode, the brake fluid pressure and the regenerative braking torque when the ABS control process is started. FIGS. 12A through 12C show the relationship between the control mode, the brake fluid pressure and the regenerative braking torque when the ABS control process is finished. FIG. 11C shows changes of the regenerative braking torque relating to the traction motors 7–9 when the ABS control process is started. FIG. 12C shows changes of the regenerative braking torque relating to the traction motors 7–9 when the ABS control process is finished.

When the antilock braking control process in FIG. 10 is started, the motor control unit 30 in step S202 detects whether the ABS control process is currently performed by the brake control unit 31. As described previously, an ABS execution flag signal is supplied from the brake control unit 31 to the motor control unit 30 when the ABS control process relating to the hydraulic brakes 16–19 is started. The detection in step S202 is made by the motor control unit 30 based on the ABS execution flag signal supplied from the brake control unit 31.

If the result at step S202 is affirmative (the ABS control process is currently performed), step S204 detects whether the control mode of the brake control unit 31 is currently the LOWER mode in which the braking force produced by the hydraulic brakes 16–19 on the wheels 3–6 is reduced. If the result at step S204 is affirmative, step S206 is performed. In step S206, the motor control unit 30 determines a regenerative braking torque value T to be output to the motor driver 14 by subtracting the given torque value A from the previous regenerative braking torque value To (T= To–A).

After step S206 is performed, step S208 detects whether the regenerative braking torque value T determined in step S206 is less than zero. If the result at step S208 is affirmative (T<0), step S210 sets the regenerative braking torque value T equal to zero (T=0). After step 210 is performed, step S214 outputs the regenerative braking torque value T (which equals zero) to the motor driver 14. The braking force produced by the traction motors 7–9 on the wheels 3–6 is adjusted to equal zero torque by the motor driver 14. The antilock braking control process in FIG. 10 is temporarily finished.

If the result at step S208 is negative (T>0), the process proceeds step S214. In step S214, the regenerative braking torque value T determined in step S206 is output from the motor control unit 30 to the motor driver 14. The braking force produced by the traction motors 7–9 on the wheels 3–6 is adjusted by the motor driver 14 according to the torque value T output from the motor control unit 30. Then, the antilock braking control process in FIG. 10 is temporarily finished.

On the other hand, if the result at step S204 is negative (the control mode of the brake control unit 31 is not currently the LOWER mode), step S212 is performed. In step S212, the motor control unit 30 sets a regenerative braking torque value T to be the previous regenerative braking torque value To (T= To). After step S212 is performed, step S214 is performed. Then, the antilock braking control process in FIG. 10 is temporarily finished.

Steps S202 through S214 are repeatedly performed after the start (the time "t2") of the ABS control process by the brake control unit 31. As indicated in FIG. 11C, the regenerative braking torque value T determined by the motor control unit 30 is gradually reduced due to the repetition of step S206 in a synchronous manner with the timing with which the brake fluid pressure applied to the hydraulic brakes 16–19 is reduced. For this reason, the reduction of the braking force produced by the traction motors 7–9 on the wheels is always synchronized with the reduction of the braking force produced by the hydraulic brakes 16–19 on the wheels, and it is possible to effectively realize the function of the ABS control process to reduce the braking force produced by one of the two braking parts on the wheels.

Similar to the first embodiment, the regenerative braking torque T is gradually reduced to zero torque due to the repetition of step S206. It is possible to prevent the running condition of the vehicle from being influenced by a sudden reduction of the regenerative braking force of the traction motors 7–9 while the frictional braking force of the hydraulic brakes 16–19 is reduced during execution of the ABS control process. The rate of change of the regenerative braking torque T can be preset to an appropriate rate of change by varying the torque value "A" in step S206 to a suitable value.

In the antilock braking control process in FIG. 10, if the result at step S202 is negative (the ABS control process is not currently performed), steps S216 through S222 are performed by the motor control unit 30. Steps S216–S222 are the same as corresponding steps shown in FIG. 5, and a description thereof will be omitted.

Steps S216 through S222 in FIG. 10 are repeatedly performed after the end (the time "t12") of the ABS control process by the brake control unit 31. As indicated in FIG. 12C, the regenerative braking torque value T determined by the motor control unit 30 is gradually raised until the reference torque Tref is reached. After the reference torque Tref is reached, the regenerative braking torque of the traction motors 7–9 is continuously held. The reference torque Tref is calculated based on the depression force set by the vehicle operator and applied to the brake pedal 21.

Next, a description will be given with reference to FIGS. 13 through 16C of a third embodiment of the antilock braking control process according to the present invention.

Figure 3:
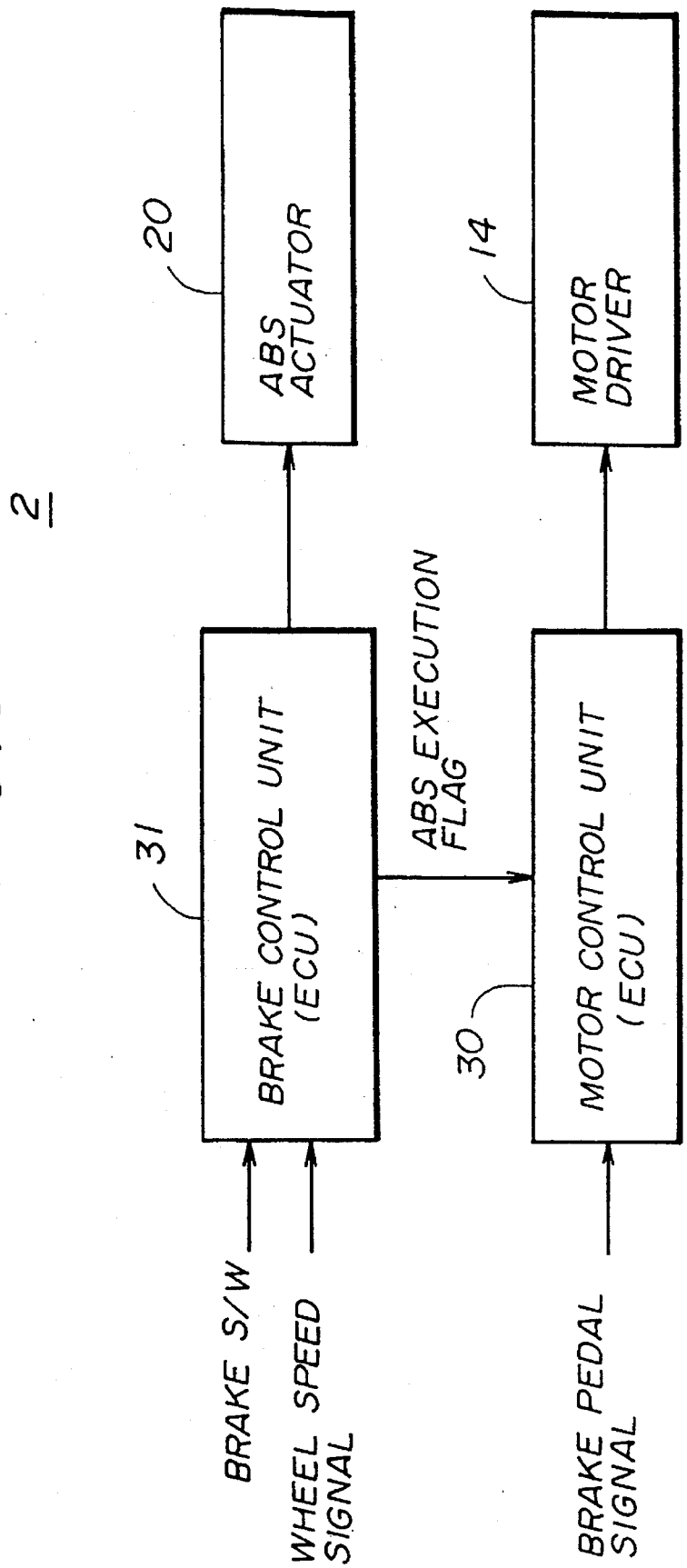
FIG. 3 is a block diagram showing an antilock braking control system of the electric vehicle in FIG. 2.
Figure 13:
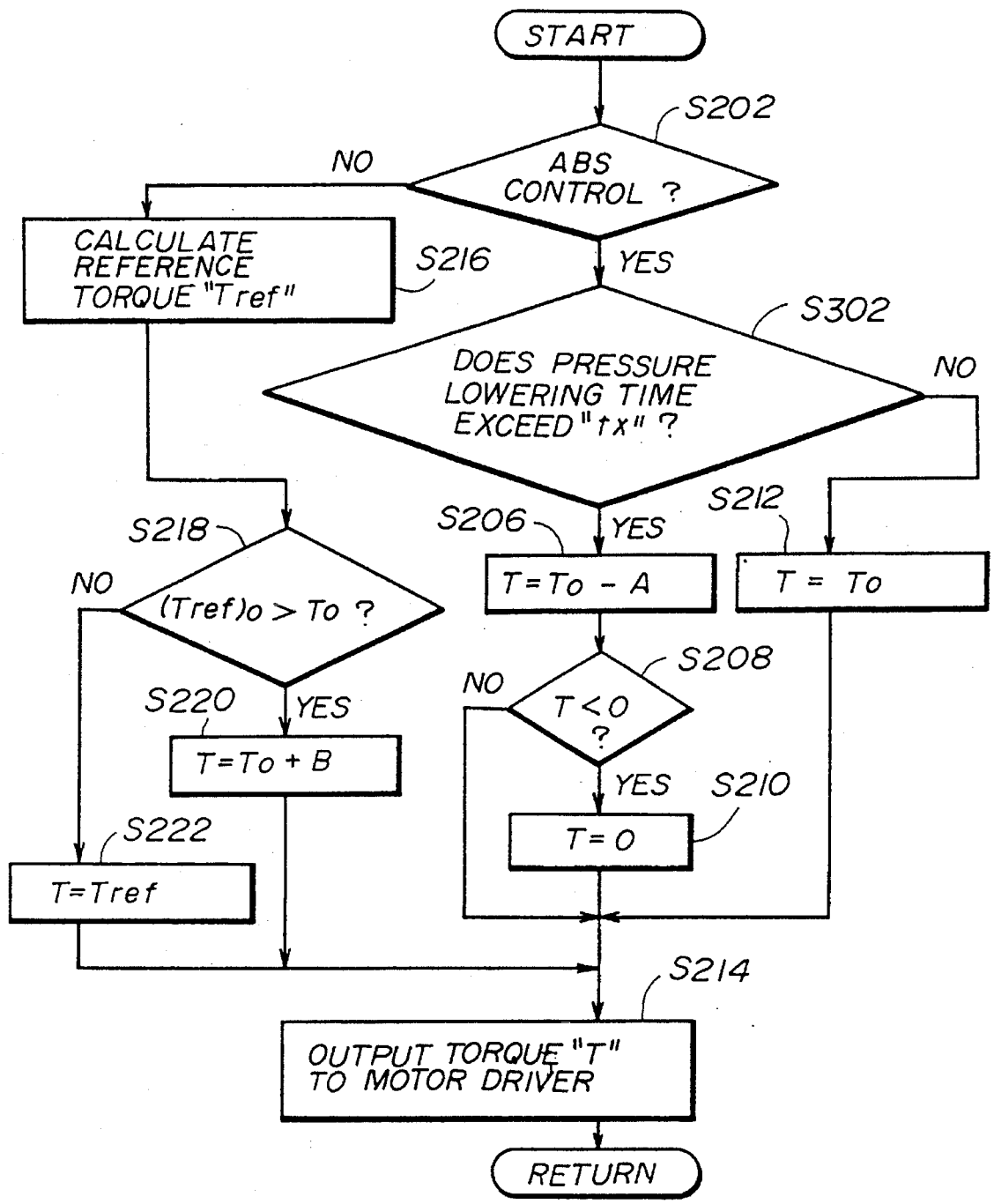
FIG. 13 is a flow diagram for explaining an antilock braking control process of a third embodiment performed by a motor control unit of the system in FIG. 3.

FIG. 13 shows the antilock braking control process of the third embodiment performed by the motor control unit 30 of the antilock braking control system shown in FIG. 3 during execution of the ABS control process by the brake control unit 31. The antilock braking control process in FIG. 13 is performed to determine a regenerative braking torque value to be output to the motor driver 14.

Figure 15A:
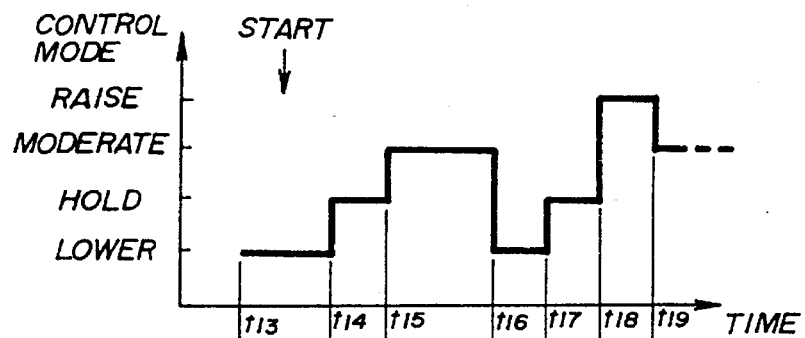
FIGS. 15A through 15C are timing charts for explaining the relationship between the control mode, the brake fluid torque and the regenerative braking torque when the ABS control process is started.
Figure 15B:
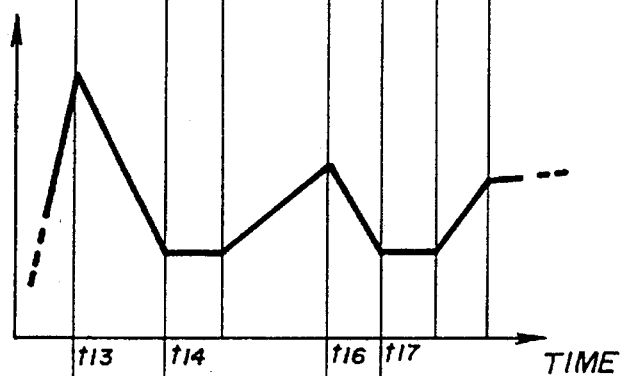
Figure 15C:
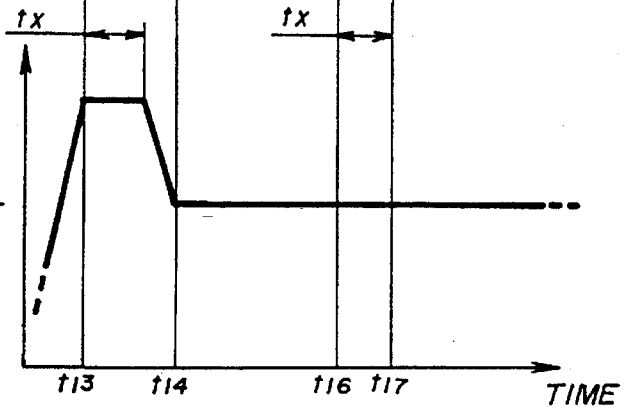
Figure 16A:
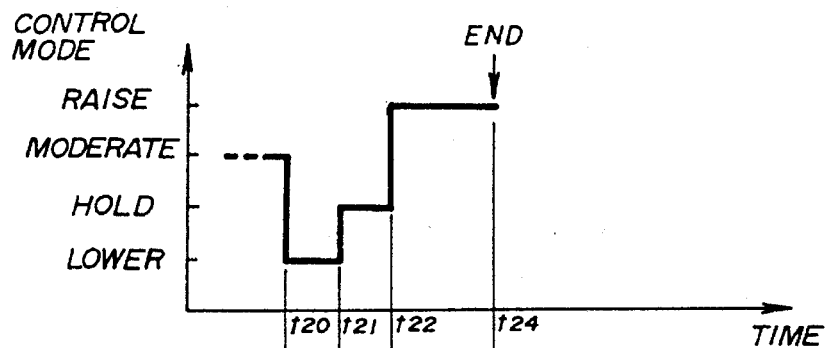
FIGS. 16A through 16C are timing charts for explaining the relationship between the control mode, the brake fluid torque and the regenerative braking torque when the ABS control process is finished.
Figure 16B:
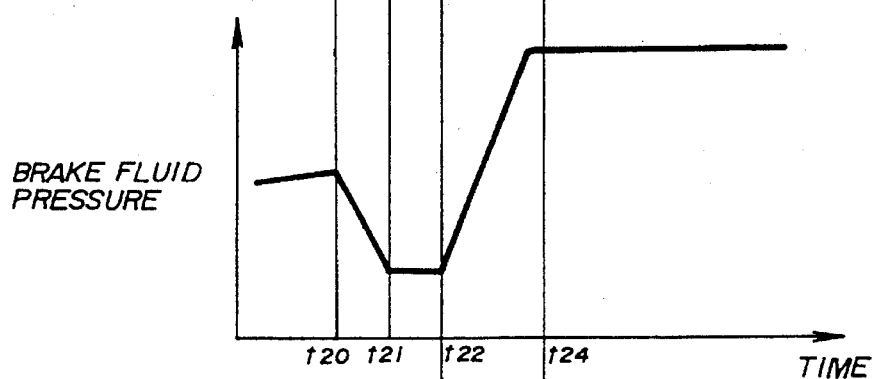
Figure 16C:
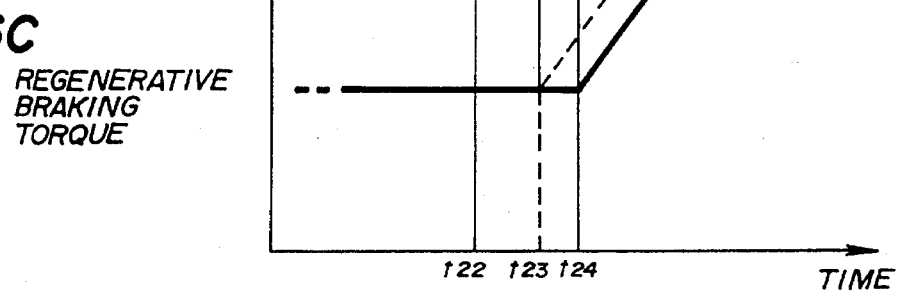

FIGS. 15A through 15C show the relationship between the control mode, the brake fluid pressure and the regenerative braking torque when the ABS control process is started. FIGS. 16A through 16C show the relationship between the control mode, the brake fluid pressure and the regenerative braking torque when the ABS control process is finished. FIG. 15C shows changes of the regenerative braking torque relating to the traction motors 7–9 when the ABS control process is started. FIG. 16C shows changes of the regenerative braking torque relating to the traction motors 7–9 when the ABS control process is finished.

In FIG. 13, the steps which are the same as corresponding steps of the second embodiment shown in FIG. 10 are designated by the same reference numerals and a description thereof will be omitted.

In step S302, the motor control unit 30 detects whether a pressure lowering time for which the brake fluid pressure determined by the brake control unit 31 with respect to the hydraulic brakes 16–19 is continuously reduced exceeds a given time period "tx". If the result at step S302 is affirmative, steps S206–S214 are performed. If the result at step S302 is negative, steps S212 and S214 are performed.

In the event that the antilock braking control process of FIG. 13 is performed, as shown in FIGS. 15A–15C, the start time at which the reduction of the regenerative braking torque value T determined by the motor control unit 30 is started is delayed by the time period tx from the start (the time "t13") of the ABS control process by the brake control unit 31. In the event that the control mode of the brake control unit 31 is changed from the LOWER mode to another mode before the time period tx has elapsed (indicated by the time period between "t16" and "t17" in FIG. 15C), the regenerative braking torque value T determined by the motor control unit 30 is not reduced.

In the antilock braking control process of FIG. 13, the braking force produced by the two braking parts on the wheels can be effectively reduced when it is necessary to quickly and greatly reduce the braking force acting on the wheels for maintaining the running stability and controllability of the vehicle. If the antilock braking control process in FIG. 13 is applied, it is possible to prevent the traction motors from unnecessarily or frequently producing the regenerative braking force on the wheels since the regenerative braking torque is not reduced when the running stability and controllability can be maintained by execution of the ABS control process relating to the hydraulic brakes 16–19 only. Thus, noise due to the reduction of the regenerative braking force of the traction motors can be reduced.

Figure 14:
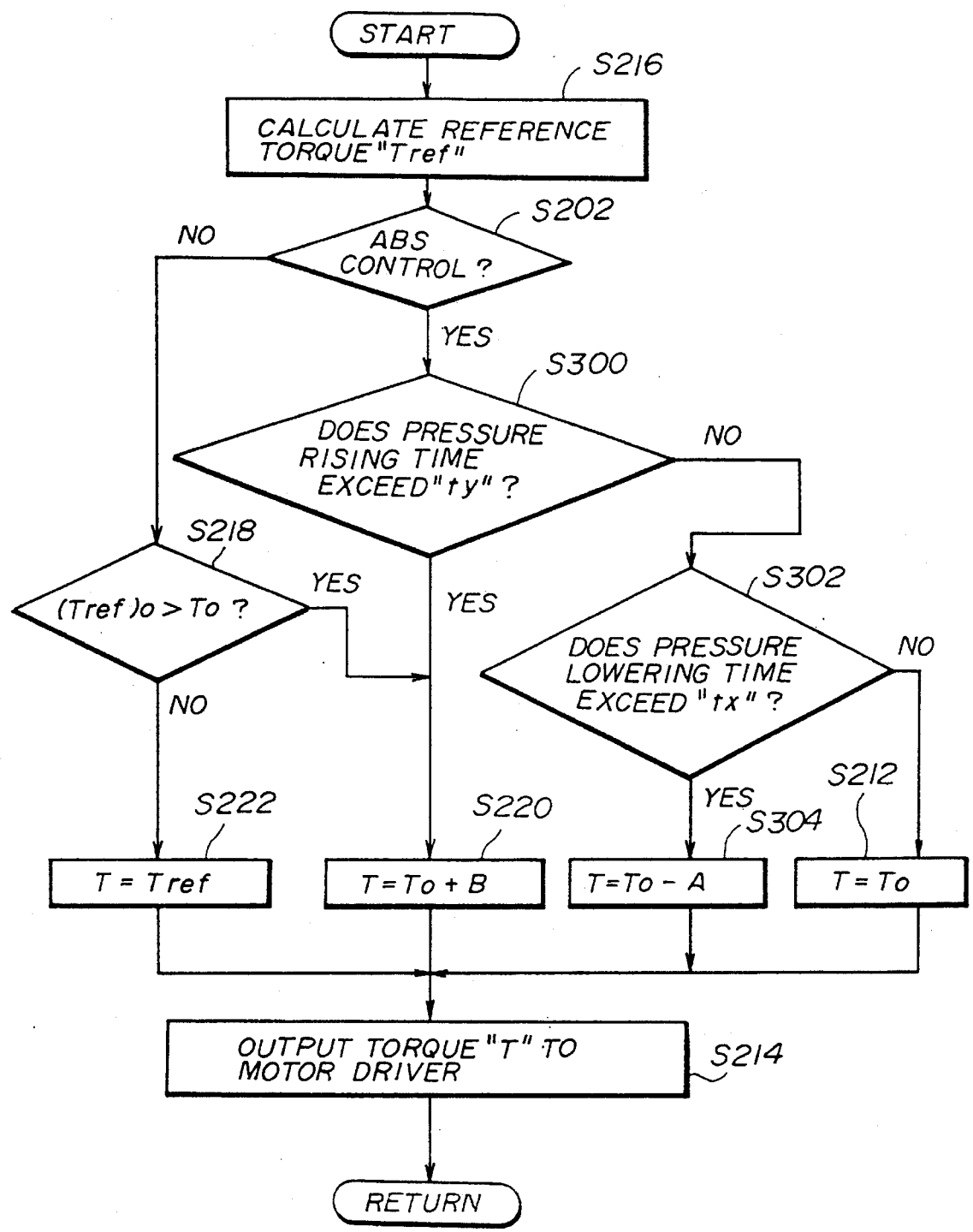
FIG. 14 is a flow diagram for explaining a modification of the antilock braking control process shown in FIG. 13.

FIG. 14 shows a modification of the antilock braking control process shown in FIG. 13. In the antilock braking control process of FIG. 14, the steps which are the same as corresponding steps shown in FIG. 13 are designated by the same reference numerals and a description thereof will be omitted.

In the antilock braking control process in FIG. 14, step S300 is performed if the result at step S202 is affirmative. In step S300, the motor control unit 30 detects whether a pressure rising time for which the brake fluid pressure determined by the brake control unit 31 with respect to the hydraulic brakes 16–19 is continuously raised (by the RAISE mode control operation of the brake control unit 31) exceeds a given time period "ty". If the result at step S300 is affirmative, steps S220 and S214 in FIG. 13 are performed. If the result at step S300 is negative, step S302 in FIG. 13 is performed.

In step S304, the motor control unit 30 performs control operations similar to the steps S206 trough S210 in FIG. 13. Chiefly, in step S304, the motor control unit 30 determines a regenerative braking torque value T by subtracting the given value A from the previous regenerative braking torque value To.

In the event that the antilock braking control process in FIG. 14 is performed, when the brake control unit 31 continuously raises the brake fluid pressure of the ABS actuator 31 relating to the hydraulic brakes 16–19 over the given time period ty, the motor control unit 30 raises the regenerative braking torque of the traction motors 7–9 during execution of the ABS control process by the brake control unit 31.

As indicated by the dotted line in FIG. 16C, the end time (the time "t23") at which the increase of the regenerative braking torque value T determined by the motor control unit 30 toward the reference torque Tref is started is advanced by the time period ty from the end (the time "t24") of the ABS control process by the brake control unit 31.

If the antilock braking control process in FIG. 14 is applied to the electric vehicle, the regenerative braking torque produced by the traction motors through the motor control unit can be more quickly raised toward the reference torque after the end of the ABS control process by the brake control unit. Thus, it is possible to ensure increased running stability and controllability of the vehicle.

Next, a description will be given with reference to FIGS. 17 through 19C of a fourth embodiment of the antilock braking control process according to the present invention.

Figure 17:
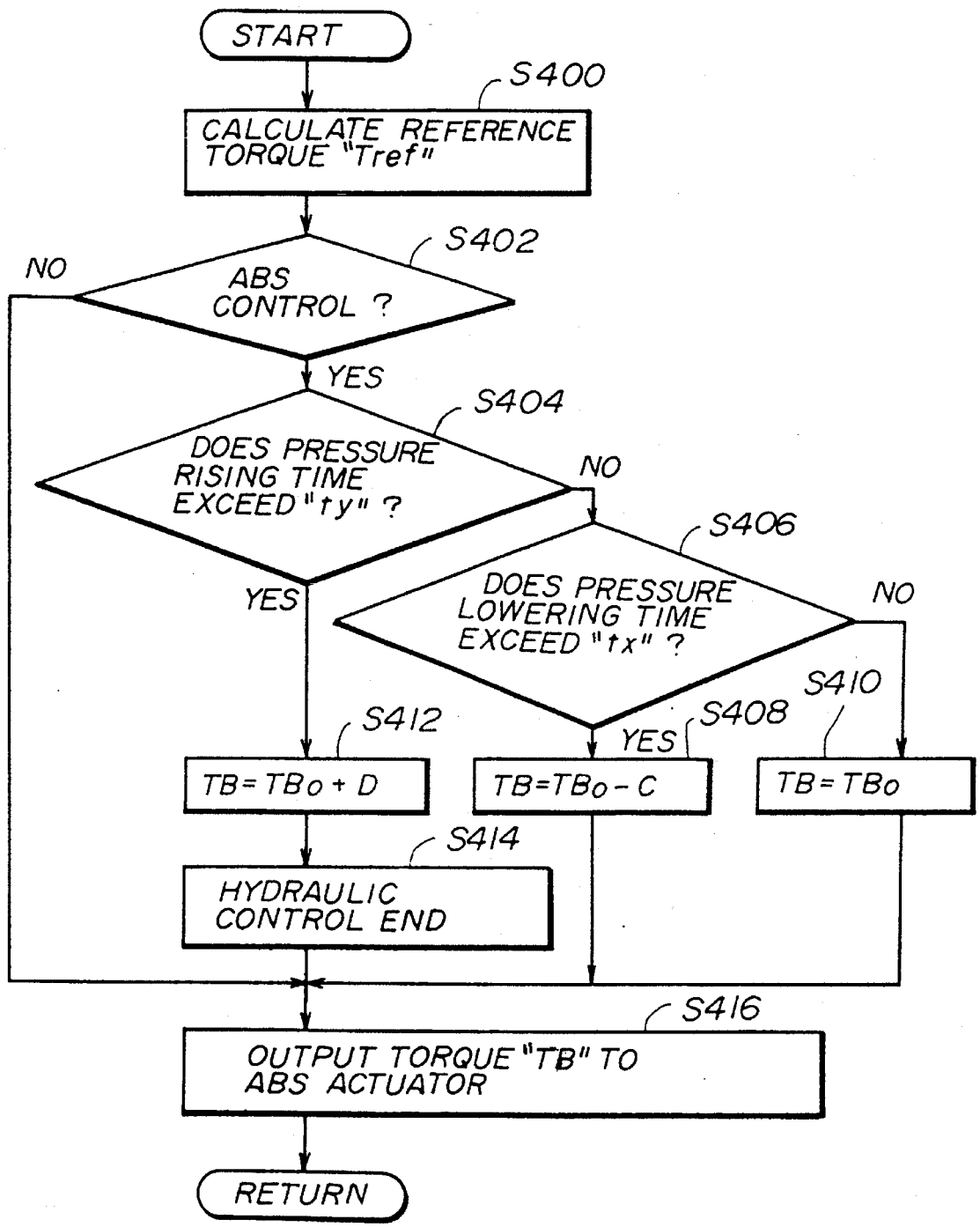
FIG. 17 is a flow diagram for explaining an antilock braking control process of a fourth embodiment performed by a brake control unit of the system shown in FIG. 3.

FIG. 17 shows this antilock braking control process of the fourth embodiment performed by the brake control unit 31 of the system in FIG. 3 during execution of the ABS control process by the motor control unit 30. The antilock braking control process in FIG. 17 is performed to determine a brake fluid pressure value TB to be output to the ABS actuator 20.

Figure 18A:
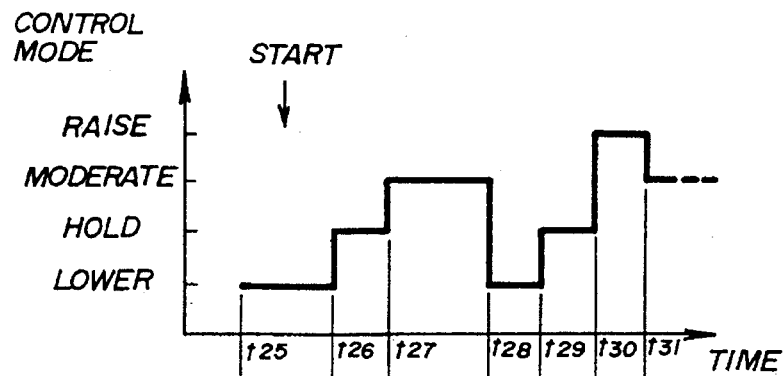
FIGS. 18A through 18C are timing charts for explaining the relationship between the control mode, the brake fluid pressure and the regenerative braking torque when the ABS control process is started.
Figure 18B:
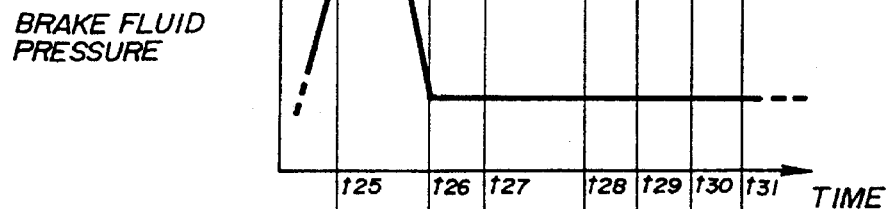
Figure 18C:
Figure 19A:
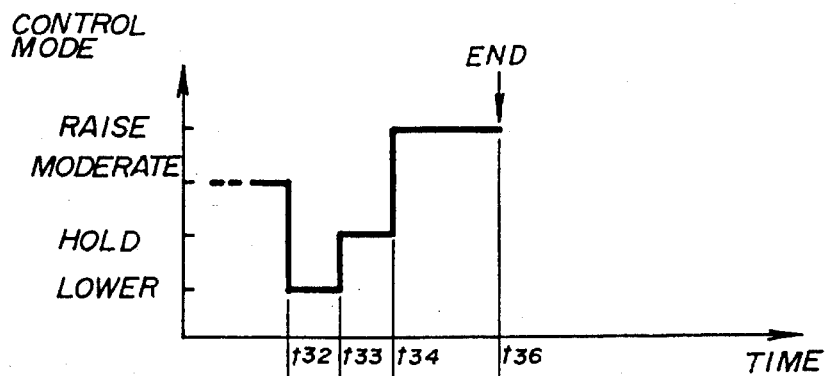
FIGS. 19A through 19C are timing charts for explaining the relationship between the control mode, the brake fluid pressure and the regenerative braking torque when the ABS control process is finished.
Figure 19B:
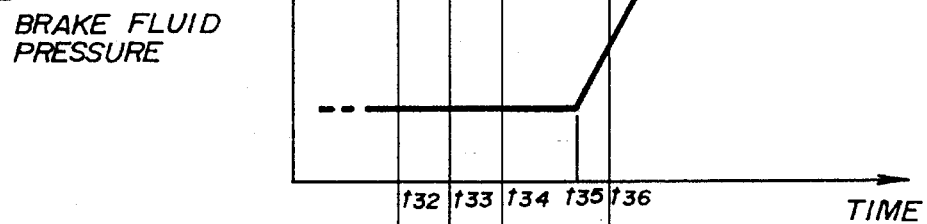
Figure 19C:
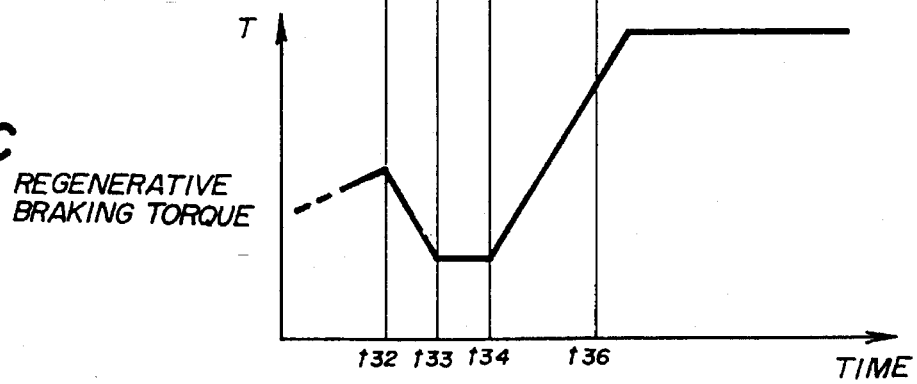

FIGS. 18A through 18C show the relationship between the control mode, the brake fluid pressure and the regenerative braking torque when the ABS control process is started. FIGS. 19A through 19C show the relationship between the control mode, the brake fluid pressure and the regenerative braking torque when the ABS control process is finished. FIG. 18B shows changes of the brake fluid pressure relating to the hydraulic brakes 16–19 when the ABS control process is started. FIG. 19B shows changes of the brake fluid pressure relating to the hydraulic brakes 16–19 when the ABS control process is finished.

When the antilock braking control process in FIG. 17 is started, the brake control unit 31 in step S400 calculates a reference torque "Tref" toward which the regenerative braking torque of the traction motors 7–9 is changed after the end of the ABS control process. After step S400 is performed, step S402 detects whether the ABS control process is currently performed by the motor control unit 30.

If the ABS control process is currently performed by the motor control unit 30 in step S402, step S404 is performed. In step S404, the brake control unit 31 detects whether the pressure rising time for which the regenerative braking torque produced by the traction motors 7–9 is continuously raised (by the MODERATE or RAISE mode control operation of the motor control unit 30) exceeds a given time period "ty".

If the result at step S404 is negative (the pressure rising time does not exceed the time period ty), step S406 is performed. In step S406, the brake control unit 31 detects whether the pressure lowering time for which the regenerative braking torque produced by the traction motors 7–9 is continuously lowered (by the LOWER mode control operation of the motor control unit 30) exceeds a given time period "tx".

If the pressure lowering time does not exceed the time period tx in step S406, step S410 is performed. In step S410, the brake control unit 31 sets the brake fluid pressure value TB equal to the previous brake fluid pressure value TBo (TB=TBo). If the result at step S406 is affirmative (the pressure lowering time exceeds the time period tx), step S408 is performed. In step S408, the brake control unit 31 determines a brake fluid pressure value TB by subtracting a given pressure value "C" from the previous brake fluid pressure TBo (TB= TBo–C).

After either step S408 or step S410 is performed, step S416 is performed. In step S416, the brake control unit 31 outputs the brake fluid pressure value TB to the ABS actuator 20. After step S416 is performed, the antilock braking control process in FIG. 17 is temporarily finished.

Accordingly, when the time period tx has elapsed after the start of the LOWER mode of the motor control unit 30, the braking force produced by the hydraulic brakes 16–19 on the wheels is reduced by the ABS actuator 20 according to the brake fluid pressure output from the brake control unit 31.

On the other hand, if the result at step S404 is affirmative (the pressure rising time exceeds the time period ty), step S412 is performed. In step S412, the brake control unit 31 determines a brake fluid pressure value TB by adding a given pressure value "D" to the previous brake fluid pressure TBo (TB= TBo+ D).

After step S412 is performed, step S414 finishes the brake fluid pressure control operation of the brake control unit 31. In step S414, the brake control unit 31 detects whether the execution of the antilock braking control process by the brake control unit 31 is needed. When the antilock braking control process is not needed, the brake fluid pressure control operation is finished in step S414.

After step S414 is performed, step S416 outputs the brake fluid pressure value TB to the ABS actuator 20. Thus, when the time period ty has elapsed after the start of the MODERATE or RAISE mode of the motor control unit 30, the braking force produced by the hydraulic brakes 16–19 on the wheels is raised toward the reference torque Tref by the ABS actuator 20 according to the brake fluid pressure output from the brake control unit 31.

If the result at step S402 is negative, step S416 is performed.

In the antilock braking control process in FIG. 17, the time at which the reduction of the braking force produced by the hydraulic brakes on the wheels is started is delayed by the time period "tx" from the start (the time "t25" ) of the LOWER mode of the motor control unit 30, as shown in FIG. 18B. When the control mode of the motor control unit 30 is changed from the LOWER mode to another mode before the time period tx has elapsed as indicated in the time period between "t28" and "t29" in FIG. 18B, the braking force produced by the hydraulic brakes on the wheel is not reduced.

In the antilock braking control process in FIG. 17, the time "t35" at which the increase of the braking force produced by the hydraulic brakes on the wheels is started is advanced by the time period "ty" from the end (the time "t36") of the ABS control process by the motor control unit 30, as shown in FIG. 19B. Accordingly, the regenerative braking torque produced by the traction motors through the motor control unit can be more quickly raised toward the reference torque after the end of the ABS control process by the brake control unit. Thus, it is possible to ensure increased running stability and controllability of the vehicle.

Similar to the third embodiment if the antilock braking control process in FIG. 17 is applied, the braking force produced by the two braking parts on the wheels can be effectively reduced when it is necessary to quickly and greatly reduce the braking force acting on the wheels for maintaining the running stability and controllability of the vehicle.

It is readily understood that the second through fourth embodiments of the present invention described above are applicable to the electric vehicles 32 and 33 of FIGS. 7 and 8 as well as the electric vehicle 1 of FIG. 2.

Next, a description will be given with reference to FIGS. 20 through 24C of a fifth embodiment of the antilock braking control apparatus according to the present invention.

In the first embodiment, when the vehicle is traveling on a road with a very low wheel-to-road friction coefficient, it is necessary to quickly and greatly reduce the braking force on the braked wheels by using either the regenerative braking part or the second braking part during the execution of the ABS control process by the other one of the two braking parts. However, if the braking force by the regenerative braking part reaches its lowest limit force (or equals zero) during execution of the ABS control process, it is impossible for the first embodiment to further reduce the braking force by the second braking part on the wheels. Thus, the running stability and controllability of the vehicle at this time becomes poor due to slipping of the braked wheels.

The fifth embodiment of the present invention is intended to provide an antilock braking control apparatus in which, if the braking force produced by either of the two braking parts is reduced to its lowest limit during execution of the ABS control process, the braking force produced by the other braking part is further reduced to avoid slipping of the braked wheels on the road.

Figure 20:
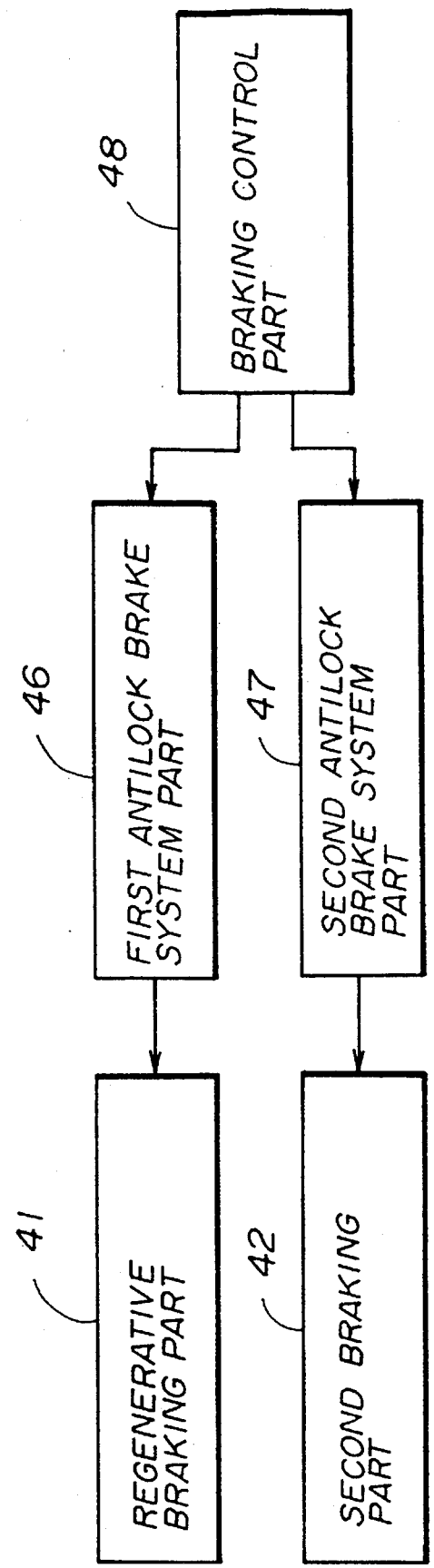
FIG. 20 is a block diagram showing a fifth embodiment of the antilock braking control apparatus according to the present invention.

FIG. 20 shows the fifth embodiment of the antilock braking control apparatus according to the present invention. In FIG. 20, the antilock braking control apparatus comprises the regenerative braking part 41, the second braking part 42, a first antilock brake system part 46, a second antilock brake system part 47, and a braking control part 48.

Similar to the first embodiment, the regenerative braking part 41 is operatively connected with one or more traction motors of an electric vehicle for braking a plurality of wheels of the vehicle by using regenerative braking torque. The second braking part 42 is operatively connected with the wheels of the vehicle for braking the wheels of the vehicle by using brake fluid pressure.

In FIG. 20, the first antilock brake system part 46 performs an antilock brake system control process to control a braking force produced by the regenerative braking part 41 on the wheels to avoid slipping of the braked wheels. The second antilock brake system part 47 performs an antilock braking control process to control a braking force produced by the second braking part 42 on the wheels to avoid the slipping of the braked wheels.

When the braking force produced by the regenerative braking part 41 on the wheels is reduced to its lowest force limit during execution of the antilock brake system control process performed by the first antilock brake system part 46, the braking control part 48 enables the second antilock brake system part 47 to perform an antilock braking control process to reduce the braking force produced by the second braking part 42 on the wheels.

Figure 21:
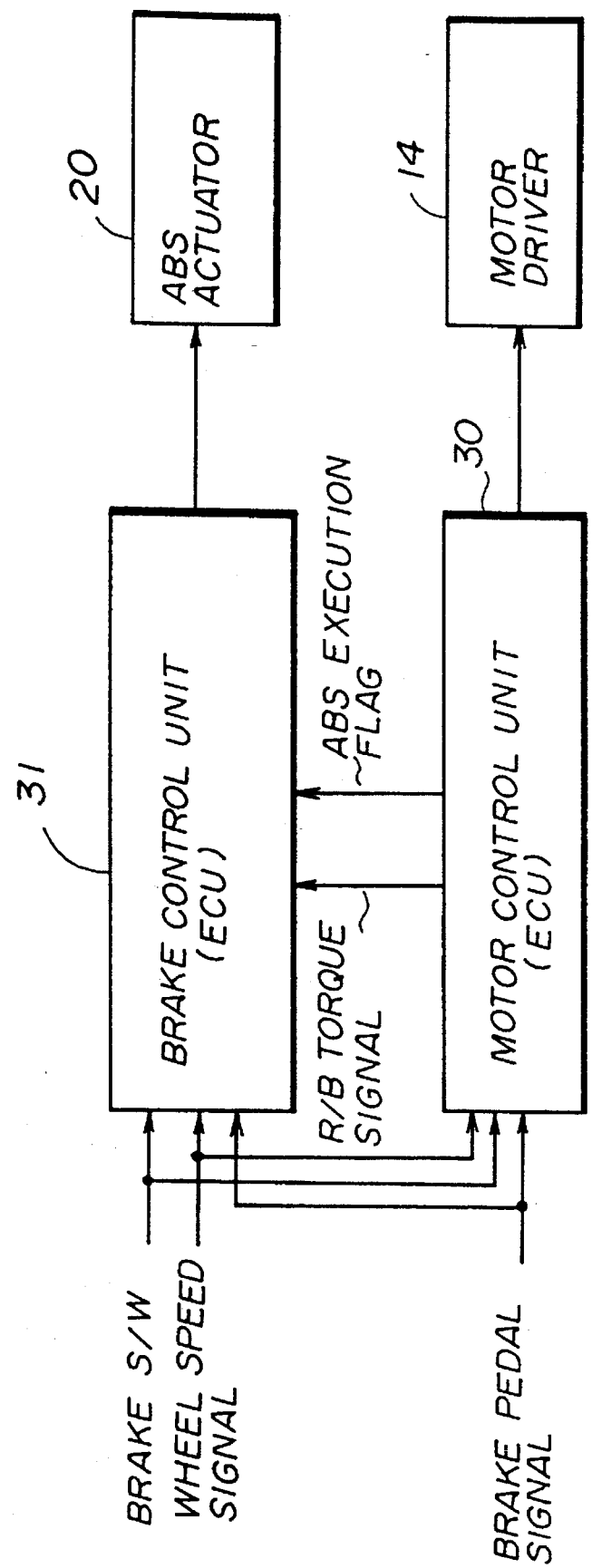
FIG. 21 is a block diagram showing an antilock braking control system of the fifth embodiment applied to an electric vehicle.

FIG. 21 shows an antilock braking control system of the fifth embodiment which is applicable to the electric vehicle shown in FIG. 2. In FIG. 21, the antilock braking control system includes the motor driver 14, the ABS actuator 20, the motor control unit 30 and the brake control unit 31, which are similar to those parts of the system in FIG. 3 described above. Each of the motor control unit 30 and the brake control unit 31 is made up of an electronic control unit (ECU) as described above.

In the antilock braking control system in FIG. 21, a brake switch signal output from the brake switch 25, a brake pedal signal output from the brake pedal sensor 24 and a wheel speed signal output from each of the wheel speed sensors 26–29 are input to both the motor control unit 30 and the brake control unit 31.

In the antilock braking control system shown in FIG. 21, an antilock brake system (ABS) control process is performed by either the motor control unit 30 or the brake control unit 31. When the ABS control process is performed by the motor control unit 30, the regenerative braking force produced by the traction motors 7–9 on the wheels 3–6 is reduced by the motor driver 14 to avoid slipping of the braked wheels. On the other hand, when the ABS control process is performed by the brake control unit 31, the braking force produced by the hydraulic brakes 16–19 on the wheels 3–6 is reduced to avoid slipping of braked wheels.

In the antilock braking control system shown in FIG. 21, the ABS control process is performed by the motor control unit 30 preferentially to the execution of the ABS control process by the brake control unit 31. When the ABS control process is started by the motor control unit 30, an ABS execution flag signal indicating the execution of the ABS control process is supplied from the motor control unit 30 to the brake control unit 31. Also, a regenerative braking torque signal indicating the regenerative braking torque determined by the motor control unit 30 is supplied to the brake control unit 31.

Figure 23A:
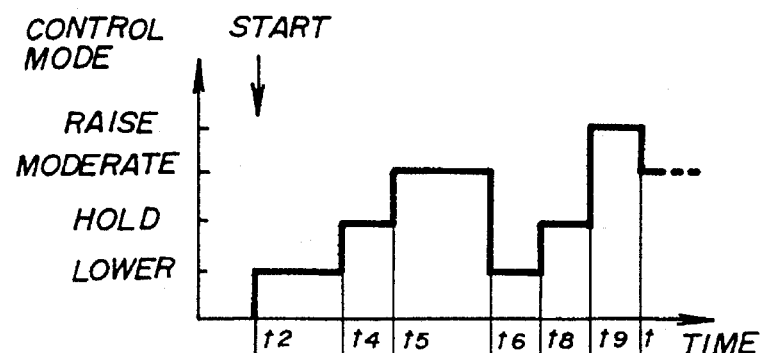
FIGS. 23A through 23C are timing charts for explaining the relationship between the control mode, the brake fluid pressure and the regenerative braking torque when the ABS control process is started.
Figure 23B:
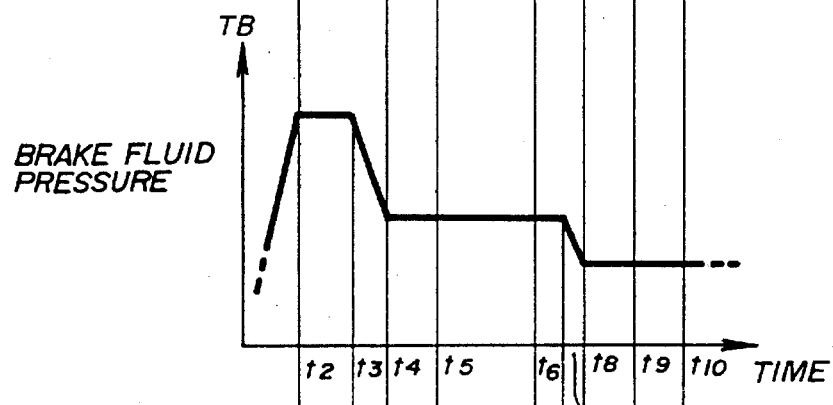
Figure 23C:
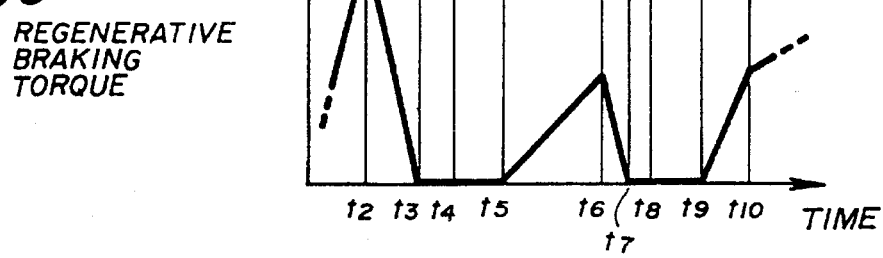

Next, a description will be given with reference to FIGS. 23A through 23C of the ABS control process performed by the antilock braking control system in FIG. 21. FIGS. 23A through 23C show changes of the control mode, the brake fluid pressure and the regenerative braking torque during the execution of the ABS control process.

When the ABS control process is performed by the motor control unit 30, the rotating speed of each of the wheels 3–6 is always monitored by the motor control unit 30 based on the wheel speed signals supplied from the wheel speed sensors 26–29 to the motor control unit 30. The motor control unit 30 calculates an estimated vehicle speed based on the wheel speeds sensed. The motor control unit 30 detects whether the brake pedal 21 is depressed, based on the brake switch signal supplied from the brake switch 25.

When the brake pedal 21 is depressed, the motor control unit 30 detects whether the wheel speed which is below the estimated vehicle speed has become lower than a given slippage limit speed. If the wheel speed is lower than the slippage limit speed, the motor control unit 30 determines that the braked wheels are likely to slip.

The motor control unit 30 starts performing the ABS control process at the time "t2" in FIGS. 23A through 23C. The control mode of the motor control unit 30 is changed to the LOWER mode at the start (the time "t2") of the ABS control process.

In the LOWER mode, the motor control unit 30 instructs the motor driver 14 to reduce the regenerative braking torque applied to the traction motors 7–9. The braking force produced by the traction motors 7–9 on the wheels 3–6 is reduced based on the regenerative braking torque value supplied from the motor driver 14 to the traction motors 7–9. It is possible to prevent the braked wheels from slipping on the road, and the running stability and controllability of the vehicle can be held at an appropriate level. This control operation of the motor control unit 30 is indicated by the timing charts of FIGS. 23A through 23C in the time periods between "t2" and "t4" and between "t6" and "t8".

As the braking force produced by the traction motors 7–9 on the wheels 3–6 is reduced by the LOWER mode control operation of the motor control unit 30, the rotating speed of the wheels 3–6 increases from the previous rotating speed during the LOWER mode. However, in the event that the electric vehicle 1 is traveling on a road with a very low wheel-to-road friction coefficient, it is necessary to greatly reduce the braking force by the traction motors 7–9 on the wheels 3–6 to avoid slipping of the wheels.

The control operation of the motor control unit to reduce the braking force by the traction motors 7–9 on the wheels 3–6 may not be adequate on its own to avoid the slipping of the wheels. FIG. 23C shows a case in which it is difficult to prevent the wheels from slipping by reducing the braking force exerted by the traction motors 7–9 on the wheels 3–6 by means of the motor control unit 30. During the LOWER mode control operation of the motor control unit 30, the regenerative braking torque is equal to zero (the lowest limit torque) at the times "t3" and "t7" in the timing chart of FIG. 23C. After the regenerative braking torque reaches the lowest limit torque, the control mode of the motor control unit 30 is held at the LOWER mode for a certain time period. This indicates that the braking force produced by the traction motors 7–9 on the wheels 3–6 is not adequately reduced to avoid the slipping of the wheels.

In the fifth embodiment of the present invention, the brake control unit 31 performs another antilock braking control process when the reduction of the braking force produced by the traction motors 7–9 on the wheels 3–6 is not adequate to prevent slipping of the wheels. The antilock braking control process performed by the brake control unit 31 will be described later.

After the LOWER mode control operation is performed by the motor control unit 30 and the ABS control process is performed by brake control unit 31, the rotating speed of the wheels 3–6 is raised since the braking force acting on the wheels is reduced. If the wheel speed is higher than the slippage limit speed, the motor control unit 30 determines that the electric vehicle 1 has recovered from the slipping condition. The control mode of the motor control unit 30 at this time is changed from the LOWER mode to the HOLD mode.

In the HOLD mode, the motor control unit 30 instructs the motor driver 14 to maintain a constant regenerative braking torque of the traction motors 7–9 (at zero torque level). The HOLD mode control operation of the motor control unit 30 is indicated by the timing charts of FIGS. 23A through 23C in the time periods between "t4" and "t5" and between "t8" and "t9".

As the braking force by the traction motors 7–9 on the wheels 3–6 is maintained for a certain time period in the HOLD mode, the rotating speed of the wheels 3–6 further increases. If the wheel speed becomes higher than the estimated vehicle speed, the motor control unit 30 determines that the wheels 3–6 are not slipping at all. The control mode of the motor control unit 30 at this time changes from the HOLD mode to either the MODERATE mode or the RAISE mode.

In the MODERATE mode the regenerative braking torque is raised by the motor driver 14 at a moderate rate of increase, and in the RAISE mode the regenerative braking torque is raised at a relatively high rate of increase. In order to prevent the braking force on the wheels from rapidly increasing, either the MODERATE mode or the RAISE mode, whichever is appropriate, is selected by the motor control unit 30 to suitably increase the regenerative braking torque of the traction motors 7–9.

In either the MODERATE mode or the RAISE mode, the braking force acting on the wheels 3–6 is raised according to the regenerative braking torque value supplied from the motor driver 14 to the traction motors 7–9. This control operation is indicated by the timing charts of FIGS. 23A through 23C in the time periods between "t5" and "t6" and between "t9" and "t10".

As the ABS control process described above is repeatedly performed by the motor control unit 30, it is possible to effectively prevent the braked wheels from slipping after the regenerative braking torque reaches the lowest limit torque. Thus, the running stability and controllability of the electric vehicle 1 can be increased. In the course of the ABS control process performed by the motor control unit 30, a signal indicating the regenerative braking (R/B) torque value is supplied from the motor control unit 30 to the brake control unit 31 as indicated in FIG. 21.

Figure 24A:
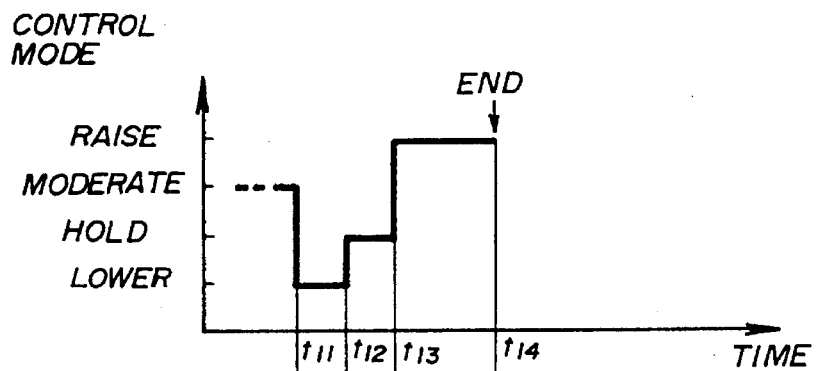
FIGS. 24A through 24C are timing charts for explaining the relationship between the control mode, the brake fluid pressure and the regenerative braking torque when the ABS control process is finished.
Figure 24B:
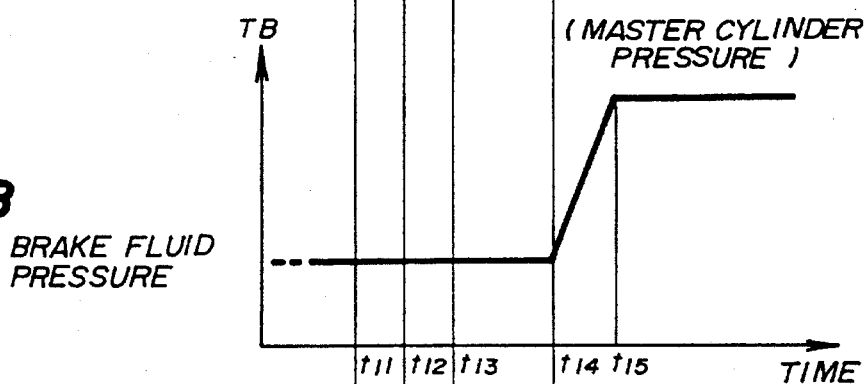
Figure 24C:
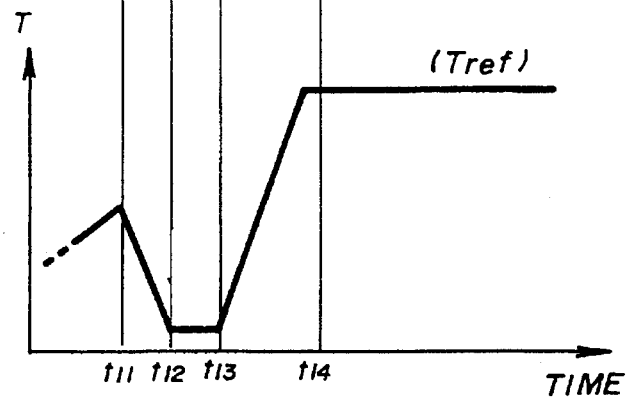

If the time during which the motor control unit 30 is continuously in the RAISE mode exceeds a predetermined time period (which is equivalent to the time period between "t13" and "t14" in FIGS. 24A through 24C), the motor control unit 30 determines that the execution of the ABS control process is no longer needed. As indicated in FIGS. 24A through 24C, the ABS control process is finished by the motor control unit 30 at the time "t14".

Next, a description will be given with reference to FIGS. 22 and 23A–23C of the antilock braking control process according to the present invention. This antilock braking control process is repeatedly performed by the motor control unit 30 of the system in FIG. 3 at given time intervals.

Figure 22:
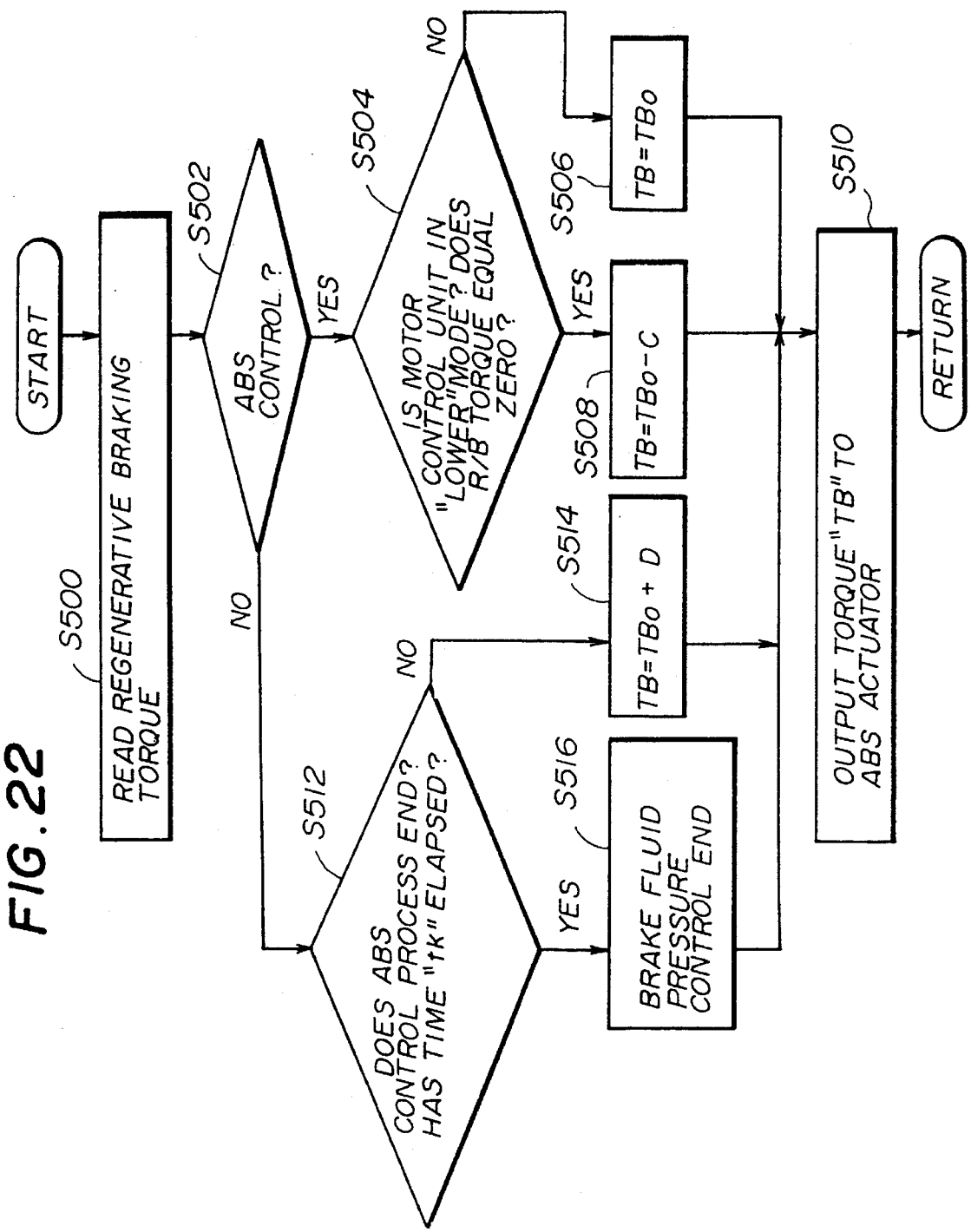
FIG. 22 is a flow diagram for explaining an antilock braking control process performed by a brake control unit of the system shown in FIG. 21.

FIG. 22 shows the antilock braking control process of the fifth embodiment performed by the brake control unit 31 of the system shown in FIG. 21.

When the antilock braking control process in FIG. 22 starts, the brake control unit 31 reads in step S500 a regenerative braking torque value based on the regenerative braking torque signal supplied from the motor control unit 30 to the brake control unit 31.

After step S500 is performed, step S502 detects whether the ABS control process is currently performed by the motor control unit 30. This detection is made by the brake control unit 31 based on the ABS execution flag signal supplied from the motor control unit 30 to the brake control unit 31 during the execution of the ABS control process.

If the result at step S502 is affirmative (the ABS control process is currently being performed), step S504 detects how the ABS control process is currently performed by the motor control unit 30. More specifically, in step S504, the brake control unit 31 detects whether the motor control unit 30 currently controls the motor driver 14 to reduce the regenerative braking torque of the traction motors 7–9 by the LOWER mode control operation mentioned above. Also, in step S504, the brake control unit 31 detects whether the regenerative braking torque of the traction motors 7–9 has reached its lowest torque level (or equals zero).

If the result at step S504 is negative, the brake control unit 31 in step S506 sets the brake fluid pressure TB to be supplied to the hydraulic brakes 16–19 equal to the previous brake fluid pressure level TBo (TB= TBo). After step S506 is performed, the brake control unit 31 in step S510 outputs a signal indicating the brake fluid pressure TB determined in step S506 to the ABS actuator 20. The braking force by the hydraulic brakes 16–19 on the wheels is maintained by the ABS actuator 20 at this time. The antilock braking control process in FIG. 22 is temporarily finished.

If the result at step S504 is affirmative, the brake control unit 31 in step S508 determines the brake fluid pressure TB by subtracting a given pressure value "C" from the previous brake fluid pressure TBo (TB= TBo–C). After step S508 is performed, step S510 outputs a signal indicating the brake fluid pressure determined in step S508 to the ABS actuator 20. The braking force by the hydraulic brakes 16–19 on the wheels is gradually reduced by the ABS actuator 20. The antilock braking control process in FIG. 22 is temporarily finished.

Steps S500 through S510 are repeatedly performed by the brake control unit 31 when the ABS control process is performed by the motor control unit 30. As indicated in FIGS. 23A–23C, the brake fluid pressure of the hydraulic brakes 16–19 is reduced (corresponding to steps S508 and S510) in the time periods between "t3" and "t4" and between "t7" and "t8" when it is detected that the motor control unit 30 is performing the LOWER mode control operation and that the regenerative braking torque of the traction motors 7–9 equals zero. As indicated in FIGS. 23A–23C, the brake fluid pressure of the hydraulic brakes 16–19 is maintained (corresponding to steps S506 and S510) in the time periods between "t4" and "t7" and between "t8" and "t10" when the motor control unit 30 is not in the LOWER mode or when the regenerative braking torque of the traction motors 7–9 does not equal zero.

Accordingly, if the braking force by the traction motors 7–9 on the wheels is reduced to its lowest limit force during the execution of the ABS control process by the motor control unit 30, the braking force by the hydraulic brakes 16–19 on the wheels is further reduced according to the antilock braking control process of this embodiment. Thus, it is possible to ensure increased running stability and controllability of the vehicle.

In the antilock braking control process shown in FIG. 22, if the result at step S502 is negative (the ABS control process is not currently being performed), step S512 is performed. In step S512, the brake control unit 31 detects whether the ABS control process is finished by the motor control unit 30, and detects whether a given time "tk" has elapsed since the end of the ABS control process. The given time "tk" is equivalent to the time period between "t14" and "t15" in FIGS. 24A–24C. The detection regarding the end of the ABS control process is made by the brake control unit 31 based on the ABS execution flag signal supplied from the motor control unit 30 to the brake control unit 31.

If the result at step S512 is negative, step S514 is performed. In step S514, the brake control unit 31 determines a brake fluid pressure TB to be supplied to the hydraulic brakes 16–19 by adding a given pressure value D to the previous brake fluid pressure TBo (TB= TBo+D). After step S514 is performed, step S510 outputs the brake fluid pressure TB determined in step S514 to the ABS actuator 20. The braking force exerted by the hydraulic brakes 16–19 on the wheels is increased by the ABS actuator 20 at this time. Then, the antilock braking control process in FIG. 22 is temporarily finished.

If the result at step S512 is affirmative, step S516 is performed. In step S516, the brake fluid pressure control operation is finished by the brake control part 31. Then, the antilock braking control process in FIG. 22 is temporarily finished.

Steps S502 through S516 are repeatedly performed by the brake control unit 31 after the ABS control process is finished by the motor control part 30. As indicated in FIG. 24B, the brake fluid pressure TB determined by the brake control unit 31 is gradually increased until the master cylinder pressure is reached. The rate of change of the brake fluid pressure TB during the given time "tk" (equivalent to the time period between "t14" and "t15" in FIG. 24B) can be preset to an appropriate rate by setting the given pressure value "D" in step S514 to a suitable value.

In the fifth embodiment described above, when the braking force exerted by one of the two braking parts on the wheels is reduced to equal the lowest limit during the execution of the ABS control process, the braking force produced by the other braking part on the wheels is also reduced to avoid the slipping of the wheels. Thus, it is possible for the fifth embodiment to ensure increased running stability and controllability of the vehicle.

It is readily understood that the fifth embodiment of the present invention described above is applicable to the electric vehicles 32 and 33 in FIGS. 7 and 8 as well as to the electric vehicle 1 in FIG. 2.

Further, the present invention is not limited to the above described embodiments, and variations and modifications may be made without departing from the scope of the present invention.

What is claimed is:

1. An antilock braking control apparatus for an electric vehicle having a plurality of wheels driven by one or more traction motors, said apparatus comprising:

regenerative braking means operatively connected with one or more traction motors of the electric vehicle for braking a plurality of wheels of the electric vehicle by using regenerative braking torque;

second braking means operatively connected with said wheels of the electric vehicle for braking said wheels by using brake fluid pressure;

antilock brake system means for performing an antilock brake system control process to control a braking force produced by said regenerative braking means on said wheels to avoid slipping of said braked wheels; and braking control means for changing a braking force produced by said second braking means on said wheels to equal zero after the start of an antilock brake system control process relating to said regenerative braking means performed by said antilock brake system means.

2. An apparatus according to claim 1, wherein said braking control means changes a braking force produced by said regenerative braking means on the wheels to equal zero after the start of an antilock brake system control process relating to said second braking means performed by said antilock brake system means.

3. An apparatus according to claim 1, wherein said regenerative braking means comprises a motor driver connected to the traction motors, and said braking control means comprises an electronic control unit connected to said motor driver.

4. An apparatus according to claim 1, wherein said second braking means comprises an actuator operatively connected with a plurality of hydraulic brakes arranged on the wheels, and said braking control means comprises an electronic control unit connected to said actuator.

5. An apparatus according to claim 1, wherein the wheels of the electric vehicle are driven by only one traction motor.

6. An apparatus according to claim 1, wherein the wheels of the electric vehicle are driven by a plurality of traction motors.

7. An apparatus according to claim 1, wherein said second braking means comprises an actuator for supplying brake fluid pressure to a plurality of hydraulic brakes arranged on the wheels of the vehicle, and said brake fluid pressure supplied by said actuator being adjusted in response to a depression force set by a vehicle operator.

8. An apparatus according to claim 1, wherein said braking control means comprises means for detecting whether an antilock brake system control process relating to either one of said two braking means is being performed by said antilock brake system means.

9. An apparatus according to claim 1, wherein said braking control means comprises means for determining a regenerative braking torque value by subtracting a given value from a previous regenerative braking torque value when an antilock brake system process is performed by said antilock brake system means.

10. An antilock braking control apparatus for an electric vehicle having a plurality of wheels driven by one or more traction motors, said apparatus comprising:

regenerative braking means operatively connected with one or more traction motors of the electric vehicle for braking a plurality of wheels of the electric vehicle by using regenerative braking torque;

second braking means operatively connected with said wheels of the electric vehicle for braking said wheels by using brake fluid pressure;

antilock brake system means for performing an antilock brake system control process to control a braking force produced by said regenerative braking means on said wheels to avoid slipping of said braked wheels; and synchronizing means for reducing, after the start of an antilock brake system control process relating to said regenerative braking means performed by said antilock brake system means, a braking force produced by said second braking means on said wheels in a manner synchronous with a reduction of the braking force produced by said regenerative braking means on said wheels during said antilock brake system control process.

11. An apparatus according to claim 10, wherein, after the start of an antilock brake system control process relating to said second braking means performed by said antilock brake system means, said synchronizing means reduces a braking force produced by said regenerative braking means on the wheels in a manner synchronous with a reduction of the braking force produced by said second braking means on the wheels during said antilock brake system control process.

12. An apparatus according to claim 10, wherein said regenerative braking means comprises a motor driver connected to the traction motors, and said synchronizing means comprises an electronic control unit connected to said motor driver.

13. An apparatus according to claim 10, wherein said second braking means comprises an actuator operatively connected with a plurality of hydraulic brakes arranged on the wheels, and said synchronizing means comprises an electronic control unit connected to said actuator.

14. An apparatus according to claim 10, wherein said synchronizing means comprises means for detecting whether or not a braking force produced by one of said two braking means on the wheels is reduced in the course of an antilock brake system control process relating to said one of said two braking means performed by said antilock brake system means.

15. An antilock braking control apparatus for an electric vehicle having a plurality of wheels driven by one or more traction motors, said apparatus comprising:

regenerative braking means operatively connected with one or more traction motors of the electric vehicle for braking a plurality of wheels of the electric vehicle by using regenerative braking torque;

second braking means operatively connected with said wheels of the electric vehicle for braking said wheels by using brake fluid pressure;

first antilock brake system means for performing an antilock brake system control process to control a braking force produced by said regenerative braking means on said wheels to avoid slipping of said braked wheels;

second antilock brake system means for performing an antilock braking control process to control a braking force produced by said second braking means on said wheels to avoid slipping of said wheels; and braking control means for enabling said second antilock brake system means to perform an antilock braking control process to reduce a braking force produced by said second braking means on said wheels when a braking force produced by said regenerative braking means on said wheels has been reduced to equal a lowest force limit during execution of said antilock brake system control process performed by said first antilock brake system means.

16. An apparatus according to claim 15, wherein said regenerative braking means comprises a motor driver connected to the traction motors, and said braking control means comprises an electronic control unit connected to said motor driver.

17. An apparatus according to claim 15, wherein said second braking means comprises an actuator operatively connected with a plurality of hydraulic brakes arranged on the wheels, and said braking control means comprises an electronic control unit connected to said actuator.

18. An apparatus according to claim 15, wherein said first antilock brake system means supplies to said braking control means a first signal representing the execution of an antilock brake system control process performed by said first antilock brake system means and a second signal representing a regenerative braking torque value of said regenerative braking means, and said braking control means reads said first and second signals from said first antilock brake system means.

* * * * *